United States Patent [19]

Oinoue

[11] Patent Number: 4,626,674
[45] Date of Patent: Dec. 2, 1986

[54] FOCUS DETECTING METHOD AND APPARATUS

[75] Inventor: Ken'ichi Oinoue, Suginami, Japan

[73] Assignee: Olympus Optical Company, Ltd., Tokyo, Japan

[21] Appl. No.: 578,228

[22] Filed: Feb. 8, 1984

[30] Foreign Application Priority Data

Feb. 10, 1983 [JP] Japan .................................. 58-19592
Feb. 10, 1983 [JP] Japan .................................. 58-19593
Nov. 18, 1983 [JP] Japan .................................. 58-218117

[51] Int. Cl.$^4$ .............................................. G01J 1/20
[52] U.S. Cl. ..................................... 250/201; 250/204
[58] Field of Search ............... 250/201, 204, 208, 209; 354/406, 407, 408

[56] References Cited

U.S. PATENT DOCUMENTS 4,341,953 7/1982 Sakai et al. .......................... 354/406

Primary Examiner—David C. Nelms
Attorney, Agent, or Firm—Louis Weinstein

[57] ABSTRACT

A focus detecting method and its apparatus arranges two rows of photoelectric transducer elements in positions optically equivalent to plane position which are located before and behind a presumed focal plane of an image forming optical system, respectively, divide a light beam into a first light beam passing through a first half portion of an exit pupil and a second light beam passing through a second half portion of the exit pupil by a shift generating optical system, primarily receive one of said first and second light beams on at least one of said first and second rows of transducer elements and primarily receive the other of said first and second light beams on at least the other of said first and second rows and performs a focus detection based on shift or displacement of images which is caused by said first and the second light beams on said first and second rows of transducer elements.

20 Claims, 38 Drawing Figures $$P \propto \frac{F^2}{dz^2}$$

F I G. 11
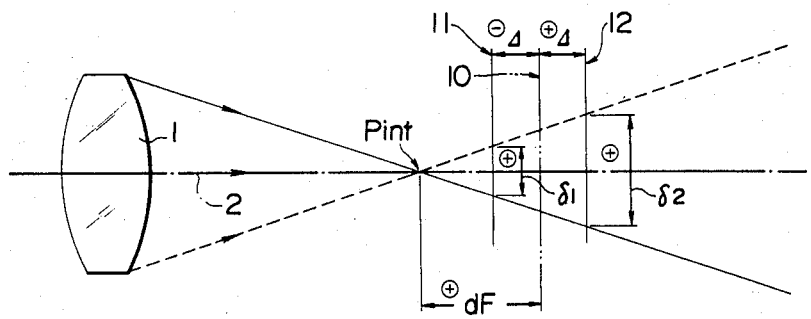
F I G. 12
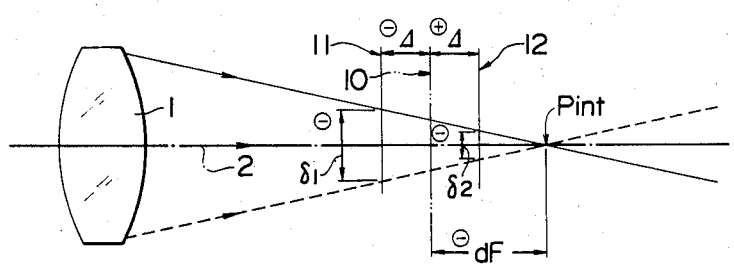
F I G. 13
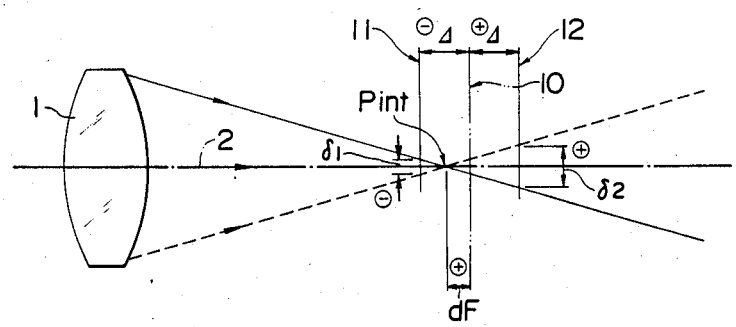

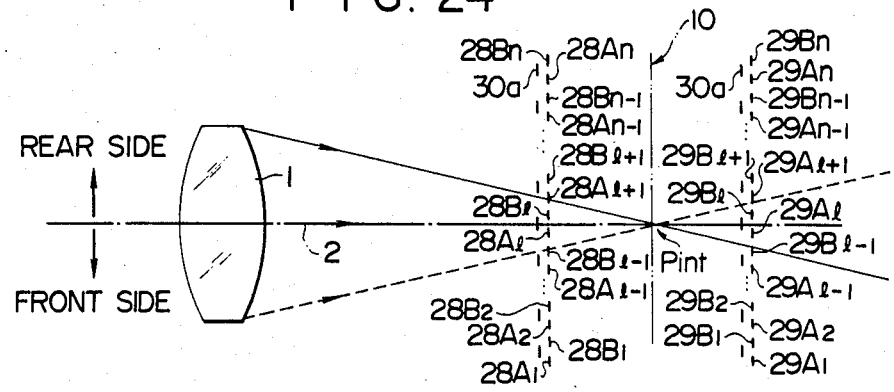
F I G. 24
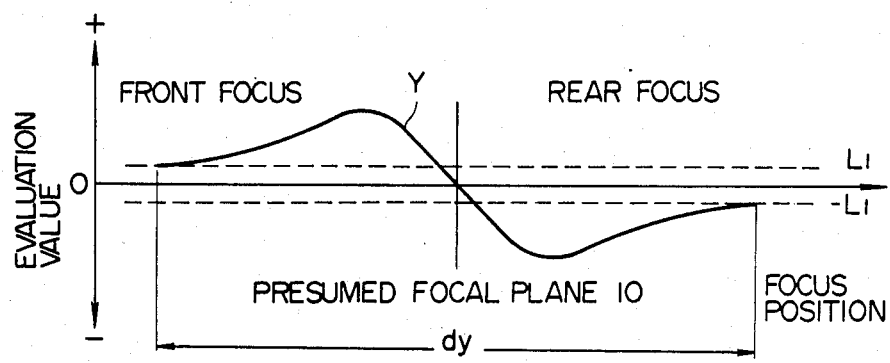
F I G. 25
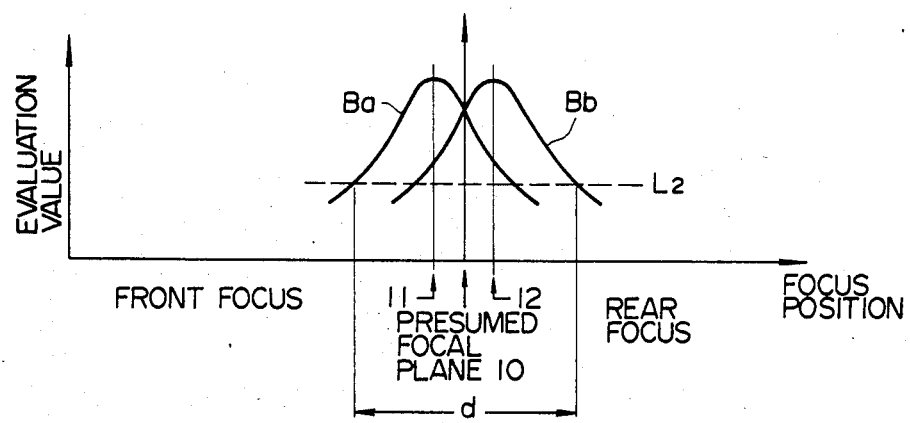
F I G. 26

FOCUS DETECTING METHOD AND APPARATUS

BACKGROUND OF THE INVENTION

The present invention relates to a focus detecting apparatus, and more particularly, to a focus detecting method and its apparatus which detect a focus condition in an optical apparatus such as a camera, a microscope or the like.

There have been known two methods of detecting a focus condition of an object image formed by an image forming lens, one being the so-called image blur detecting methods which determine an evaluation value which indicates the sharpness of an image projected onto photoelectric transducer means and the other being the so-called image shift detecting methods which determine an evaluation value which indicates shift or displacement between two images projected onto photoelectric transducer means by two light beams passing primarily through one half and another half portions of an exit pupil which are divided by a plane including an optical axis of an image forming lens.

Such conventional methods will be described hereinafter with reference to the attached drawings. FIG. 1 is a schematic sectional view of an optical system of a focus detecting apparatus embodying the image blur detecting method which is applied to a single-lens reflex camera. In FIG. 1, a light beam through a taking lens 1 is reflected by a quick-return mirror 3 one part of which is formed as a half-mirror 3a and is led to a view finder optical system (not shown) located in the upper side of the camera. A light beam passing through the half-mirror 3a is directed further to a beam splitter 6 of a focus detecting apparatus 5 located in the lower side of the camera by a total reflection mirror 4 which is disposed behind the mirror 3. The beam splitter 6 has two optical path separating planes so that the incident light beam is divided into two optical paths and respective light beams impinge on photoelectric transducer element rows 8, 9 on a light receiving substrate 7 located below beam splitter 6. The transducer element rows 8, 9 have light receiving surfaces whose positions are optically equivalent to plane positions 11, 12 at a given distance interval of $\Delta$ before and behind a presumed focal plane (a film surface) 10 of the lens 1, respectively. In the focus detecting apparatus, the sharpness of images on light receiving surfaces of the rows 8, 9 are obtained by outputs of respective rows and focus conditions for a front focus, rear focus and in focus are determined by comparing the sharpness values thus obtained of two images.

Generally, a light intensity P of a point image formed by an image forming optical system is given by $P \propto F^2/dZ^2$, where F is an F number of a lens and $dZ$ is an amount out of focus. From the expression, as shown in FIG. 2, the intensity P attenuates rapidly when an out of focus condition occurs and the rate of change in the intensity extremely decreases when the amount out of focus increases beyond a certain value. Accordingly, even though the apparatus can detect an in-focus condition with a high accuracy, the difference between the intensities of images detected by the rows 8, 9 decreases when the amount out of focus is large. As a result, even though the lens 1 is largely out of position from the focal plane 10 in a front focus or a rear focus, the situation may be erroneously determined as an in-focus. To eliminate this disadvantage, it is conceivable that the given distance $\Delta$ in the optical path is made larger so that the difference between the light intensities may increase when the amount out of focus becomes large. In such case, the light intensities in the transducer element rows 8, 9 for an image only having high frequency components are extremely reduced when properly in-focus and the difference between the light intensities in the rows 8, 9 does not vary sufficiently within a wide defocused range so that the in-focus detection may be difficult. Conversely, when the distance $\Delta$ in the optical path is reduced in accordance with an image including high frequency components, an in-focus condition for the image including high frequency components may be detected with a high accuracy. However, in this case, as described above, there is a possibility of erroneously determining an in-focus condition when the amount out of focus is large and it is difficult to detect an in-focus condition for an image only having low frequency components since the difference between their light intensities is insufficient to detect. In addition, in such an image blur detecting method, the difference between light intensities does not directly correspond to the defocused amount from the focal plane 10 of the lens 1 so that the amount of shift or displacement of the lens 1 to the in-focus position may not be determined.

FIG. 3 is a schematic section view of an optical system in a focus detecting apparatus embodying the image shift detecting method which is applied to a single-lens reflex camera and similar parts to those in FIG. 1 are given like reference numerals. In the focus detecting apparatus 15, a light beam from a taking lens 1 which is reflected by a total reflection mirror 4 impinges through a fly-eye lens array 16 which is formed with a number of fly-eye lenses onto a photoelectric transducer element row 18 on a light receiving substrate 17 which is disposed proximate a plane which is optically equivalent to the presumed focal plane 10 and in close proximity to the lens array 16. The transducer element row 18, as further shown in FIG. 4, is composed of two groups of photoelectric transducer elements 18A, 18B, each group having n pieces of transducer elements. All transducer elements $18A_1$ to $18A_n$ and $18B_1$ to $18B_n$ of the element groups 18A, 18B are arranged in a straight line and the two adjacent elements in each of the groups 18A, 18B form a pair. The fly-eye lens array 16 has n fly-eye lenses $16_1$ to $16_n$ corresponding to n pairs of photoelectric transducer elements and is arranged in such a manner that two transducer elements forming each pair of transducer elements separately receive light beams which pass primarily through mutually different portions of an exit pupil of the lens 1, an upper and a lower portion divided by a plane including an optical axis 2 in FIG. 3 which plane is perpendicular to the sheet surface.

In the apparatus 15 constructed as described above, when an image of an object being photographed is projected through the lens 1 and the lens array 16 onto the transducer element row 18, a light beam passing primarily through the upper portion in the exit pupil of the lens 1 impinges on the transducer element group 18A and a light beam passing primarily through the lower portion in the exit pupil of the lens 1 impinges on the transducer element group 18B. The light intensity distributions of the image projected onto the transducer element groups 18A, 18B coincide when in-focus and displace with respect to each other in the opposite directions when out of focus, as shown in FIG. 5, in accordance with respective displacement directions. The focus detecting apparatus 15 detects the displacement direction of the image by properly processing outputs of the transducer element groups 18A, 18B and determines a focussing condition, such as a front focus, a rear focus or an in-focus, based on the detection of the displacement direction.

The focus detecting apparatus employing the image shift detecting method has much greater advantages in a detectable range of focus than the image blur detecting method. However, the apparatus requires the provision of a gap between successive fly-eye lenses $16_1$ to $16_n$ so that the images of the exit pupil of the lens 1 which are formed by each of fly-eye lenses $16_1$ to $16_n$ do not overlap each other. Accordingly, when the light intensity of an image has particularly high frequency components which change rapidly in a step form, for example, and when the step portion lies within a gap between successive fly-eye lenses, the gap belongs to an insensible zone for the image and hence the focusing accuracy will decrease. As a result, in the case of an image having high frequency components, a position which is determined as bring an in-focus position varies in accordance with a relative position between the image and each fly-eye lens and the accuracy will be insufficient. To solve the disadvantages, it is conceivable that the diameter of each fly-eye lens is further reduced or the focal length of each fly-eye lens is further shortened so as to reduce the gap between successive fly-eye lenses. With such construction, an available amount of light decreases to deteriorate the sensitivity and it is difficult to process a fly-eye lens and to make an optical adjustment between each fly-eye lens and each pair of transducer elements. Furthermore, an apparatus with such construction can detect the amount of an image shift or displacement but when the F number of the lens 1 changes by interchanging with another lens, it may cause the case that the defocused amount from the presumed focal plane 10 of the lens is not determined unless information regarding the F number of the lens 1 is given previously in any form. Thus, it is difficult to determine the amount of shift to position the lens 1 in an in-focus.

As described above, in the image blur detecting method, the range in which each of the focus conditions of a front focus, a rear focus and an in-focus is accurately detectable is limited but an in-focus condition for an image particularly having high frequency components can be advantageously detected with high accuracy by comparatively reducing the difference in the optical path between two transducer element rows disposed on opposite sides of the presumed focal plane 10. In the image shift detecting method, the range where a focus is detectable is wide and an in-focus condition for an image particularly having low frequency components can be advantageously detected with a high accuracy without practically causing the above-mentioned insensible zone for the image shift. However, in the image blur detecting method, since the difference in sharpness which is determined by transducer element rows does not directly correspond to the defocused amount from the presumed focal plane of the lens, the amount of movement of the lens to the in-focus position is not determined. In the image shift detecting method, although the amount of image shift can be detected, the amount of moving the lens to the in-focus position from the expected focal plane can not be determined unless the F number of the lens is previously given in any form. Accordingly, it is to be noted that the conventional focus detecting apparatus determines consecutively an in-focus condition while in detecting a focus condition and hence adjustment in an in-focus may not be rapidly conducted.

SUMMARY OF THE INVENTION

In view of the foregoing disadvantages, it is an object of the invention to provide a focus detecting method and its apparatus which determine the amount of an image shift or displacement employing a pair of photoelectric transducer element rows which are arranged before and behind a presumed focal plane and in positions optically equivalent thereto and a shift generating optical system and detects a focus condition based on the amount thus obtained.

It is another object of the invention to provide a focus detecting method and its apparatus which determine the amount of an image shift or displacement employing a pair of photoelectric transducer element rows which are arranged before and behind a presumed focal plane and in positions optically equivalent thereto and a shift generating optical system to determine the defocused amount of a focus position of an image forming optical system based on the amount thus obtained.

It is a further object of the invention to provide a focus detecting method and its apparatus which are capable of determining the defocused amount independent of a change in F number even when an image forming optical system having a different F number is employed.

It is a still further object of the invention to provide a focus detecting method and its apparatus which detect the sharpness and a shift condition of an image on a presumed focal plane based on outputs of a pair of photoelectric transducer element rows which are arranged before and behind the presumed focal plane and in positions optically equivalent thereto to determine the defocused amount, further followed by detecting an in-focus with a high accuracy.

According to the invention, since light beams passing through two portions in an exit pupil of a taking lens separately impinge on light receiving surfaces of photoelectric transducer element rows which are disposed before and behind a presumed focal plane of an image forming optical system and in positions optically equivalent thereto and a defocused amount is calculated by obtaining the amount of an image shift on the light receiving surfaces of the transducer element rows which are caused by the light beams based on outputs of these transducer element rows, it is possible to determine the defocused amount with a high accuracy irrespective of a change in the F number even when the F number of a taking lens changes by interchanging a lens.

In addition, the invention detects the sharpness and a shift condition of an image on a presumed focal plane based on outputs of the photoelectric transducer element rows and combines an image blur detecting method and an image shift detecting method, thus having the advantages of both methods. As a result, the focus detection is easily and accurately achieved over the entire movable range of an image forming optical system independently of the kind of an object being photographed and hence when applied to an automatic focus adjusting apparatus, a focus adjustment is effectively promptly achieved with a high accuracy by moving an image forming optical system to the in-focus position based on the defocused amount obtained and subsequently by detecting a focus condition with a shift evaluation function and an image blur evaluation function.

BRIEF DESCRIPTION OF THE DRAWINGS

FIGS. 11, 12 and 13 are analytical diagrams for explaining the relation between the defocused amounts of a taking lens under out-of-focus conditions and the amounts of image shift formed by two light beams passing through an exit pupil of a taking lens in a first focus detecting method of the invention;

FIG. 24 is a diagram showing an optically equivalent arrangement of two transducer element rows for explaining shift between two rows caused by the same light beam;

FIG. 25 is a characteristic diagram showing a shift evaluation function obtained based on a shift between two photoelectric transducer element rows which is caused by two light beams;

FIG. 26 is a characteristic diagram showing an image blur evaluation function obtained by outputs of two photoelectric transducer element rows;

DETAILED DESCRIPTION OF PREFERRED EMBODIMENTS

Figure 6:
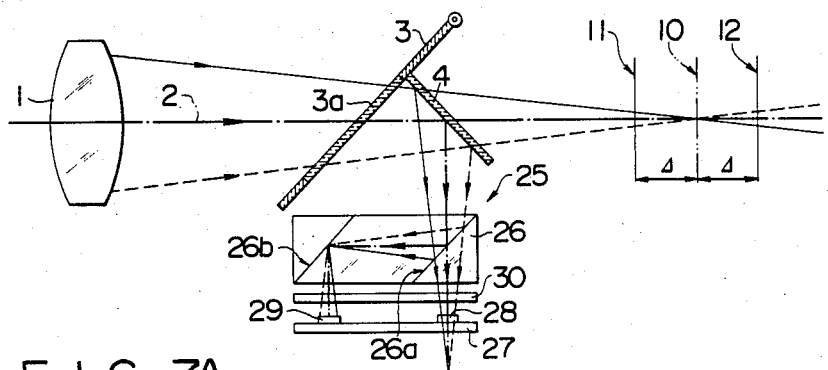
FIG. 6 is a schematic section view of a focus detecting apparatus to which a focus detecting method of the invention is applied.
Figure 7A:
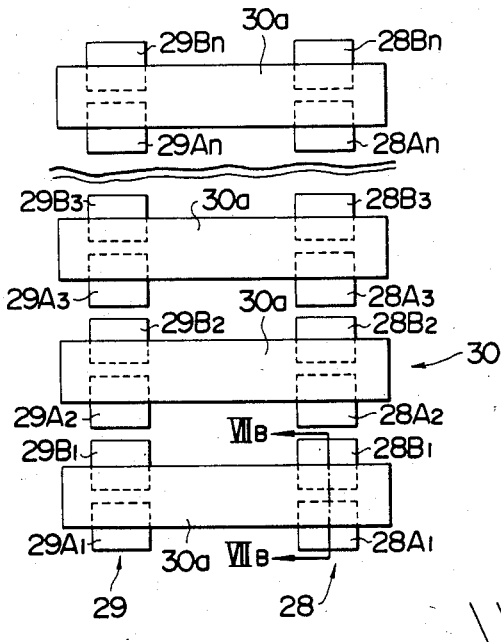
FIGS. 7A and 7B are an enlarged plan view showing an example positional relation between a shift generating optical system and two photoelectric transducer element rows in the focus detecting apparatus illustrated in FIG. 6 and an enlarged section view taken along the lines $VII_B$–$VII_B$ in FIG. 7A, respectively.
Figure 7B:
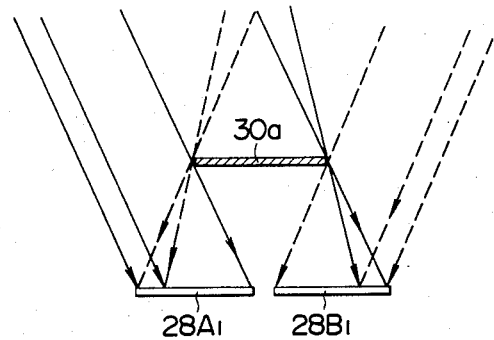
Figure 8A:
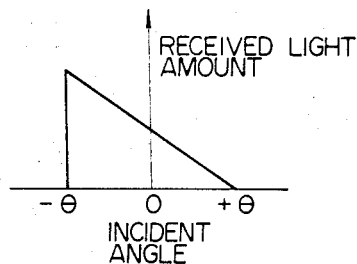
FIGS. 8A and 8B are diagrams showing the relations between an incident angle and the amounts of light received on a first and a second group of photoelectric transducer elements, respectively.
Figure 8B:
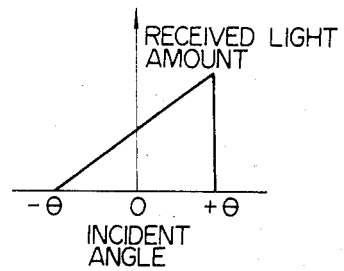

Referring now to FIG. 6, which is a schematic section view of an optical system in a focus detecting system 25 illustrating an embodiment of the invention which is applied to a single-lens reflex camera, a light beam from a total reflection mirror 4 is divided by two optical path dividing surfaces 26a, 26b of a beam splitter 26 into two light beams and subsequently light beams thus divided are led through a shift generating optical system 30 which is located below beam splitter 26 to two photoelectric transducer element rows 28, 29 arranged on a light receiving substrate 27. Light receiving surfaces of two element rows 28, 29 are located in positions optically equivalent to positions 11, 12 which are spaced at a given distance of Δ before and behind a presumed focal plane 10 respectively. The shift generating optical system 30 is constructed with a striped mask plate which is formed, arranging n individual masks 30a (see FIGS. 7A and 7B) in the direction perpendicular to the sheet surface, by vaporization, a printing process or the like on the surface of a transparent substrate such as a glass, a plastic film or the like. The positional relationship between the masks 30a and the transducer element rows 28, 29 is as shown in FIGS. 7A and 7B. Each of the transducer element rows 28, 29 comprises 2n transducer elements. Specifically, the transducer element row 28 includes a first group of n transducer elements $28A_1$ to $28A_n$ and a second group of n transducer elements $28B_1$ to $28B_n$, the first and the second element being alternately arranged in a line and each of the pairs of the first and the second element $28A_1$; $28B_1$ to $28A_n$; $28B_n$ partly faces each of masks $30a$. Similarly, the transducer element row 29 comprises a first group of n transducer elements $29A_1$ to $29A_n$ and a second group of n transducer elements $29B_1$ to $29B_n$, the first and the second element being alternately arranged in a line and each of pairs of the first and the second elements $29A_1$; $29B_1$ to $29A_n$; $29B_n$ partly faces each of masks $30a$.

A light beam from an object being photographed is separated by the masks $30a$ of the shift generating optical system 30 into two light beams passing through two portions of an exit pupil of a taking lens 1, in FIG. 6, one being a front half portion of the exit pupil and the other being a rear half portion thereof which are divided by a plane including the optical axis 2 and parallel to the sheet surface. Two divided light beams impinge on the first group of transducer elements $28A_1$ to $28A_n$, $29A_1$ to $29A_n$ and the second group of transducer elements $28B_1$ to $28B_n$, $29B_1$ to $29B_n$ in two transducer element rows 28, 29, respectively. For example, considering the pair of transducer elements $28A_1$; $29B_1$, it is seen from FIG. 7B that due to the presence of mask $30a$ a light beam passing primarily through one half portion of the exit pupil impinges on transducer element $28A_1$ of the first group and a light beam passing primarily through the other half portion of the exit pupil impinges on transducer element $28B_1$ of the second group. As such, the shift generating optical system 30 makes the first and the second group of transducer elements behave so that their amounts of received light may be dependent upon incident angles. The dependency of the light amount upon incident angles can be arbitrarily set by adjusting the width of mask $30a$ and the distance between the transducer element rows 28, 29 and the shift generating optical system 30.

Figure 9:
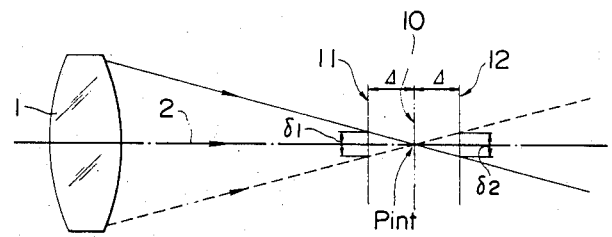
FIG. 9 is an analytical diagram for explaining shift or displacement of images formed by two light beams passing through an exit pupil of a taking lens under the in-focus condition.

In the apparatus, wherein the light receiving surfaces of the transducer element rows 28, 29 are located in positions which are optically equivalent to the planes 11, 12 which are spaced at a given distance Δ before and behind the presumed focal plane 10 respectively, as shown in FIG. 9, while in the in-focus condition where the focus point Pint at which an image is formed through the lens 1 coincides with the presumed focal plane 10, light beams passing through the upper and the lower portion which are divided by a plane including the optical axis 2 of the lens 1 and perpendicular to the sheet surface in FIG. 9 intersect each other in the presumed focal plane 10 so that the sharpness of the image becomes the highest. In the planes 11, 12, however, both light beams are shifted by $\delta_1$, $\delta_2$ along the directions perpendicular to the optical axis 2 in accordance with the given distance difference Δ in the optical path, respectively. The senses of both light beam shifts in the planes 11, 12 are opposite to each other and their shift amounts are equal. Additionally, the sharpnesses of the images in the planes 11, 12 are lower than that in the presumed focal plane 10 but are equal.

Figure 10A:
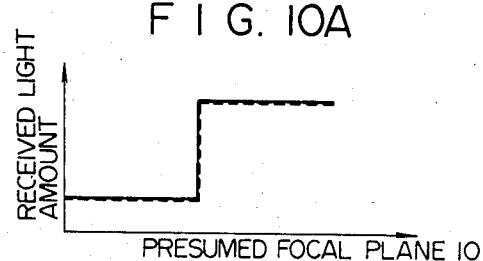
FIGS. 10A, 10B and 10C are characteristic diagrams showing received light distributions on the presumed focal plane and light receiving surfaces of two photoelectric transducer element rows under the in-focus condition shown in FIG. 9, respectively.
Figure 10B:
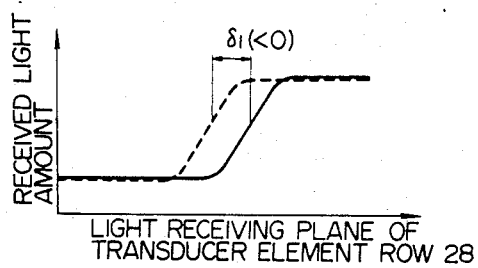
Figure 10C:
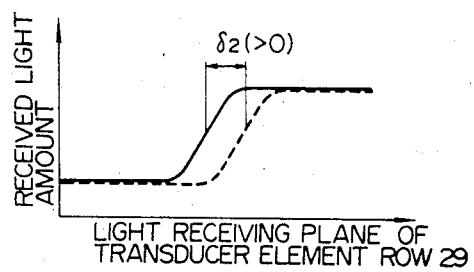

Further considering the above fact on the transducer element rows 28, 29 shown in FIG. 6, when the density distribution of an image is in a step form, for example, while in the in-focus condition wherein the focus point Pint at which the image is formed through the lens 1 is positioned in the presumed focal plane 10, both light beams passing through the front half (the upper half in FIG. 9) and the rear half (the lower half in FIG. 9) portion which are divided by a plane including the optical axis 2 and parallel (perpendicular in FIG. 9) to the sheet surface intersect each other in the presumed focal plane 10. The sharpnesses of both light beams become the highest and are in a step form as shown in FIG. 10A. At this time, in the light receiving surface of the transducer element row 28, both light beams are displaced toward respective transducer elements of the first and the second group in the direction perpendicular to the optical axis in accordance with the difference in optical path of the given distance Δ and the sharpnesses of the images are reduced so that an output of the transducer element row 28 is as shown in FIG. 10B. Similarly, in the light receiving surface of the transducer element row 29, both light beams are displaced toward respective transducer elements of the first and the second groups in the opposite direction perpendicular to the optical axis and the sharpnesses of the images are reduced so that an output of the transducer element row 29 is as shown in FIG. 10C. The absolute shift amounts $\delta_1$, $\delta_2$ in output curves of transducer elements in the first and the second group 28, 29 are equal in the in-focus condition but their difference increases with the out-of-focus.

In the focus detecting apparatus 25, when the out-of-focus condition of a front focus or a rear focus occurs, the difference between the focus point Pint at which an image is formed through the lens 1 and the presumed focal plane 10, that is, the defocused amount dF, can be obtained by the shift $\delta_1$ of the image formed on the transducer element row 28 by the above mentioned two light beams and the shift $\delta_2$ of the image formed on the transducer element row 29 by the two light beams. The relationship between the shifts $\delta_1$, $\delta_2$ of the image and the defocused amount dF will be explained hereinafter with reference to FIGS. 11 to 13. FIG. 11 shows that the focus point Pint through the lens 1 is closer to the lens 1 than the front plane position 11 which is spaced at the distance Δ from the presumed focal plane 10. FIG. 12 shows that the focus point Pint is further away from the lens 1 than the rear plane position 12 which is spaced at the distance Δ from the presumed focal plane 10. FIG. 13 shows that the focus point Pint is between the presumed focal plane 10 and the front plane position 11.

In FIGS. 11 to 13, assume that the distance Δ when the front plane 11 is located closer to the lens 1 from the presumed focal plane 10 has a minus sign and the distance Δ when the rear plane 12 is located further away from the lens 1 than the presumed focal plane 10 has a plus sign. In addition, assume that when the focus point Pint is closer to the lens 1 than the planes 11, 12 the shifts $\delta_1$, $\delta_2$ each have plus signs and when the focus point Pint is further away from the lens 1 than the planes 11, 12 the shifts $\delta_1$, $\delta_2$ each have minus signs. Also, assume that under the front focus condition where the focus point Pint of the lens 1 is closer to the lens 1 than the presumed focal plane 10 the defocused amount dF is positive and under the rear focus condition where the focus point Pint is further away from the lens 1 than the presumed focal plane 10 the defocused amount dF is negative. Specifically, when the shifts $\delta_1$, $\delta_2$ are positive, as shown in FIG. 11, images formed on the planes 11, 12 by a light beam passing through the upper portion of the exit pupil of the lens 1 which portion is divided by a plane including the optical axis 2 and perpendicular to the sheet surface are displaced downwardly in the direction perpendicular to the optical axis 2 and images formed on the planes 11, 12 by a light beam passing through the lower portion of the exit pupil are displaced upwardly in the direction perpendicular to the optical axis 2. When the shifts $\delta_1$, $\delta_2$ are negative, as shown in FIG. 12, conversely to the above, images formed on the planes 11, 12 by a light beam passing through the upper portion of the exit pupil of the lens 1 are displaced upwardly in the direction perpendicular to the optical axis 2 and images formed on the planes 11, 12 by a light beam passing through the lower portion of the pupil of the lens 1 are displaced downwardly in the direction perpendicular to the optical axis 2. Furthermore, when the shift $\delta_1$ is negative and the shift $\delta_2$ is positive, as shown in FIG. 13, while an image formed on the plane 11 by a light beam passing through the upper portion of the exit pupil of the lens 1 is displaced upwardly in the direction perpendicular to the optical axis 2, an image formed on the plane 12 is displaced downwardly in the direction perpendicular to the optical axis 2. Also, while an image formed on the plane 11 by a light beam passing through the lower portion of the exit pupil of the lens 1 is displaced downwardly in the direction perpendicular to the optical axis 2, an image formed on the plane 12 is displaced upwardly in the direction perpendicular to the optical axis 2. As can be seen from FIGS. 11 to 13, the following equation is given between the shifts $\delta_1$, $\delta_2$ and the defocused amount dF:

$$\frac{dF + \Delta}{\delta_2} = \frac{dF - \Delta}{\delta_1} \quad (1)$$

From the equation (1)

$$dF = \Delta \times \frac{\delta_1 + \delta_2}{\delta_2 - \delta_1} \quad (2)$$

is derived. Since the distance $\Delta$ between the presumed focal plane 10 and the light receiving plane 11 of the transducer element row 28 or the light receiving plane 12 of the transducer element row 29 is previously set, shift or displacement between the focus point Pint of an image formed through the lens 1 and the presumed focal plane 10, that is, the defocused amount dF, can be obtained with a sufficiently large value of $\Delta$ by measuring shift $\delta_1$ on the plane 11 and shift $\delta_2$ on the plane 12 and applying a calculation after these measured $\delta_1$, $\delta_2$ are substituted in the equation (2).

Outputs of the transducer element rows 28, 29 are processed in an electric circuit that will be described hereinafter.

Figure 14:
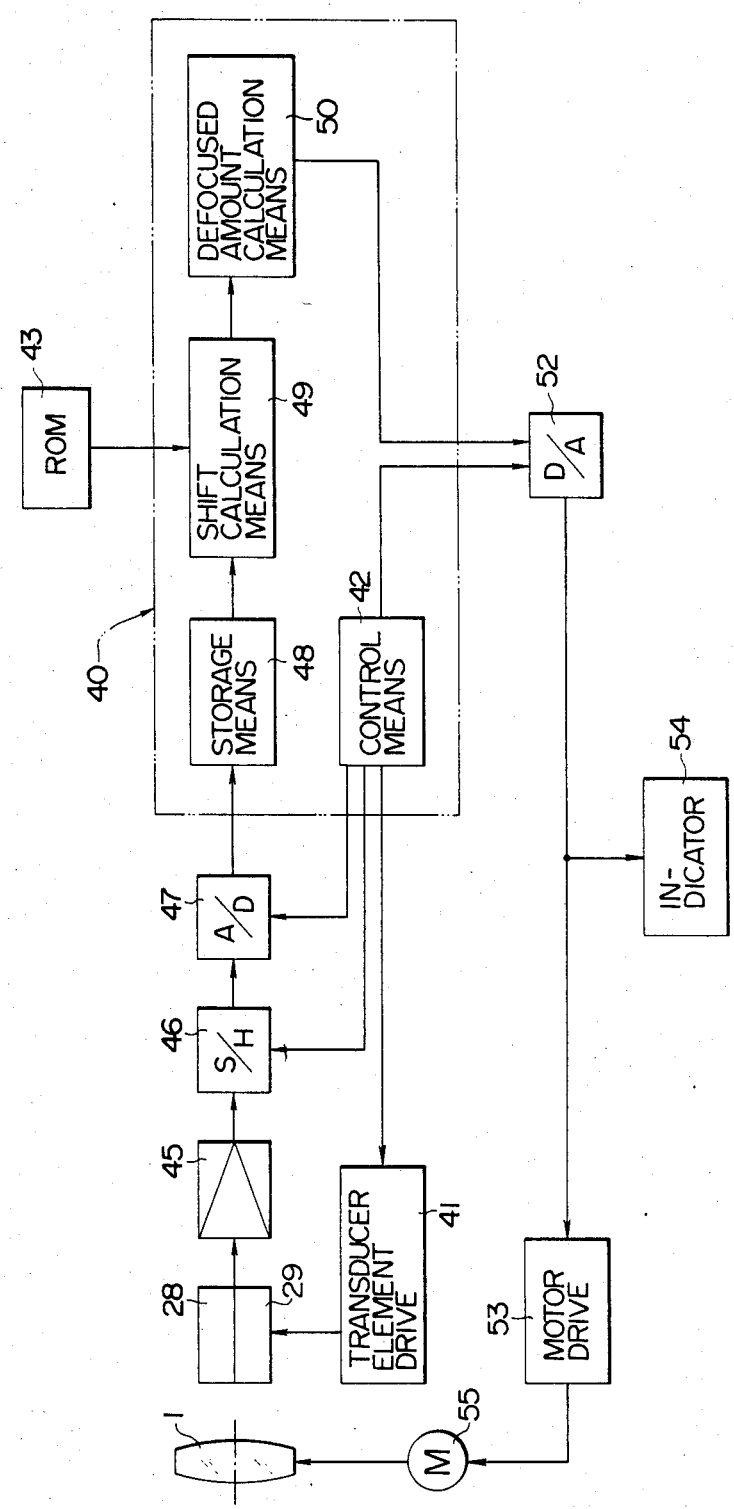
FIG. 14 is a block diagram illustrating an electric circuit of a focus detecting apparatus to which the first method of the invention is applied.

FIG. 14 is a block diagram of an electric circuit in the focus detecting apparatus which is applied to an automatic focus adjusting apparatus. A light beam which is reflected by an object being photographed and is converged through the lens 1 impinges through the optical system shown in FIG. 6 on the transducer element rows 28, 29. The photoelectric conversion in the transducer element rows 28, 29 and the readout of converted electric signal is performed by a photoelectric transducer element drive circuit 41. The operations of the transducer element drive circuit 41 are initiated by a starting signal from control means 42 within a microcomputer 40 which is operated in accordance with orders from a read only memory (hereinafter abbreviated as ROM) and are terminated by a stop signal.

A photoelectrically converted signal from the transducer element rows 28, 29 is amplified by a predetermined amplification factor by an amplifier 45 and the output thereof is led to a sample-hold circuit 46 (hereinafter abbreviated as S/H circuit) to keep its output level for a given time. The output of the S/H circuit 46 is led to an analog-digital converter 47 (hereinafter abbreviated as A/D converter) to convert the photoelectrically converted signals from an analog value which have been sample-held. The outputs of the transducer element rows 28, 29 which have now been converted to a digital value are stored in a storage means 48 within the microcomputer 40. The output of the storage means 48 is led to a shift calculation means 49 which calculates the image shifts $\delta_1$, $\delta_2$ on the light receiving planes of the transducer element rows 28, 29 and their senses. The output of the shift calculation means 49 is led to a defocused amount calculation means 50 which calculate the defocused amount. The control means 42, storage means 48, shift calculation means 49 and defocused amount calculation means 50 which are within the microcomputer 40 are operated upon occasion by orders issued from ROM 43. In addition, the control means 42 issues a control signal for operating S/H circuit 46 and A/D converter 47 at proper timing. It is to be noted that ROM 43 may be built in or externally arranged relative to the microcomputer 40. The output terminal of the microcomputer 40 is connected to a digital-analog converter 52 (hereinafter abbreviated as D/A converter) which converts a digital signal from the defocused amount calculation means 50 into an analog signal based on a control signal from the control means 42. The analog signal is supplied to a motor drive circuit 53 and an indicator 54 disposed within a view finder for indicating a front focus, a rear focus, an in-focus or the like. The motor drive circuit 53 drives a motor 55 which moves the lens 1 to the in-focus position.

Figure 15:
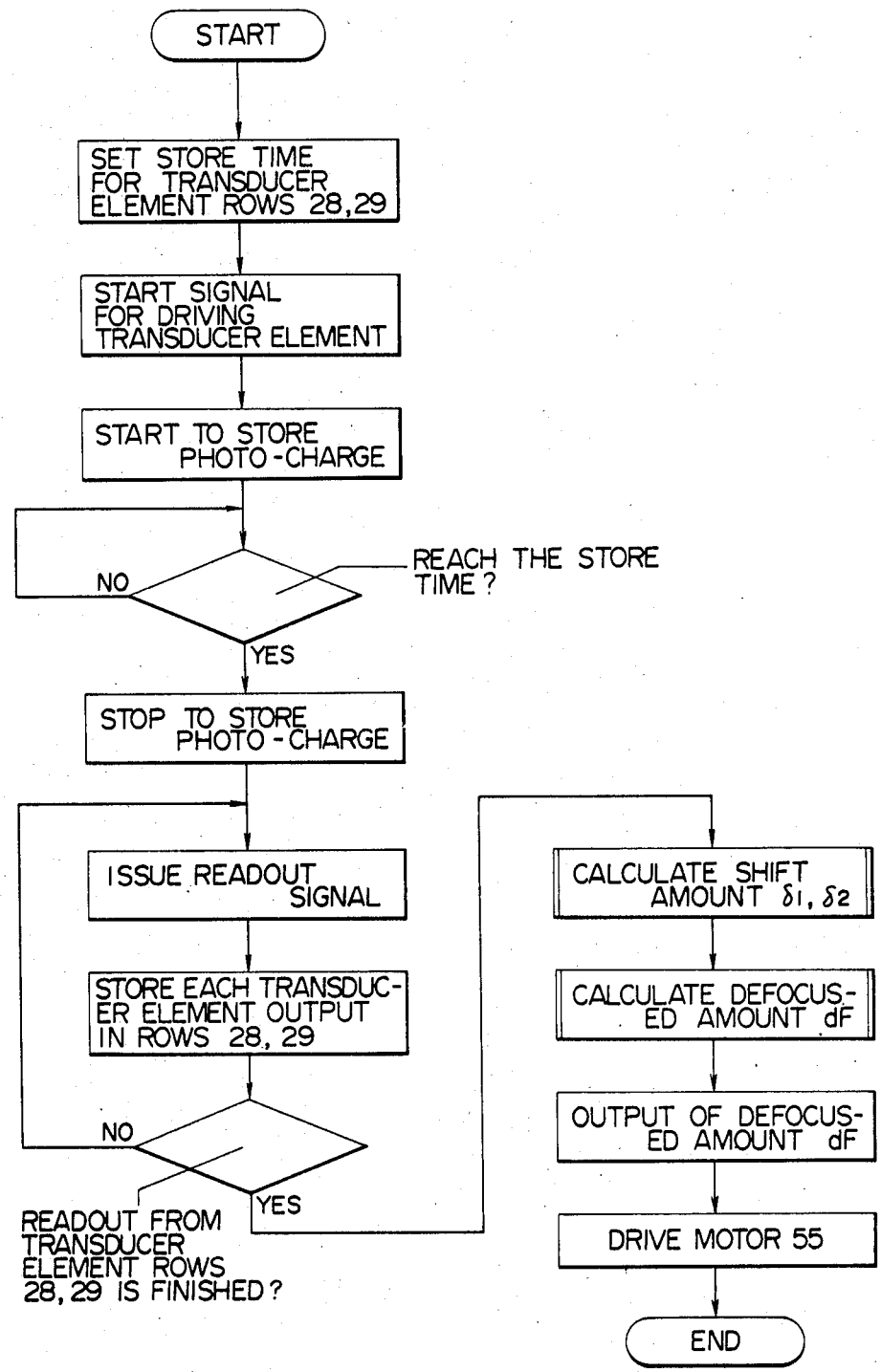
FIG. 15 is a flow chart explaining operations of the electric circuit of the focus detecting apparatus illustrated in FIG. 14.

Now operations of an electric circuit of the focus detecting apparatus shown in FIG. 14 will be explained with reference to a flow chart shown in FIG. 15. When the apparatus starts to operate by applying a start signal from the control means 42 which is built in the microcomputer 40 to the transducer element drive circuit 41, this circuit drives the transducer element rows 28, 29 to permit them to store photo-charge generated in them for a given time. The given time for storing the photo-charge may be either set by measuring the average amount of incident light corresponding to light incident upon the transducer element rows 28, 29 by a transducer element (not shown) and detecting that the average amount of incident light has reached a given value or determined by a level of photoelectrically converted output which has been obtained in the previous measuring cycle. Upon lapse of the given time, a store stop signal from the control means 42 is applied to the transducer element drive circuit 41 and the amount of stored charge in proportion to the light intensity incident upon each transducer element of the transducer element rows 28, 29 is transferred to a charge storage section (not shown) associated with each of the transducer elements. Thereafter, when readout signals from the control means 42 are successively fed to the transducer element drive circuit 41, an output voltage corresponding to the amount of stored charge is successively read out in a time series for each of transducer element rows 28, 29. Specifically, first, a photoelectrically converted output of each transducer element of the row 28 and then the readout output after amplified by an amplifier 45 is applied to the sample-hold operation in S/H circuit 46 to convert it into a digital value in A/D converter 47 of the next stage. When the output in a digital value of the row 28 is led to the microcomputer 40, it is stored in the storage circuit 48. Next, a photoelectrically converted output of each transducer element of the row 29 is read out and the readout output after amplified by the amplifier 45 is similarly applied to the sample-hold operation in S/H circuit 46 to convert it into a digital value in A/D converter of the next stage. The digital output is further stored in the storage means 48 within the microcomputer 40. At this time, a control signal for a sample-hold operation from the control means 42 to S/H circuit 46 and a control signal for initiating an A/D conversion from the control means 42 to A/D converter 47 are fed in synchronism with a readout signal which is led from the control means 42 to the transducer element drive circuit 41.

Outputs of transducer elements in the rows 28, 29 which are stored in the storage means 48 are fed to the shift calculation means 49 and determine an image shift $\delta_1$ on the row 28 caused by a light beam passing primarily through one half portion of the exit pupil of the lens 1 and another light beam passing primarily through the other half portion, as described above, and an image shift $\delta_2$ on the row 29 caused similarly to the above, with the shift calculation means 49.

Figure 16:
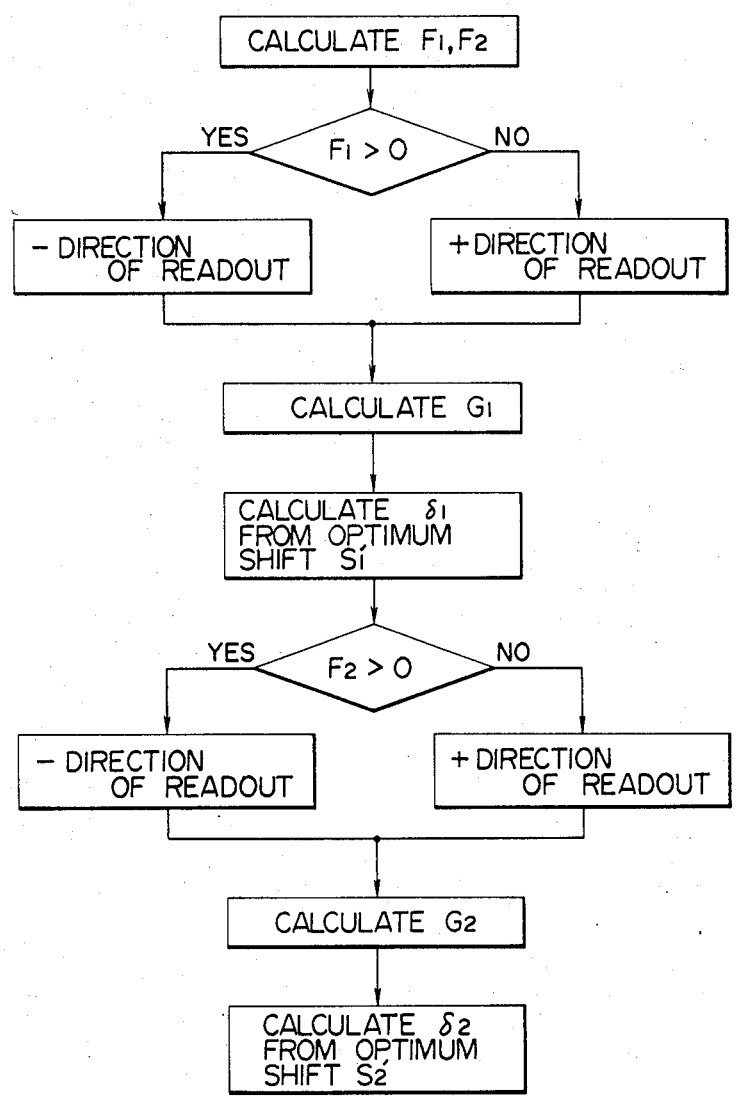
FIG. 16 is a flow chart explaining operations of a shift calculation means in FIG. 14.

The operations of the shift calculation means 49 are shown in a flow chart in FIG. 16. The light intensity distributions on the transducer element rows 28, 29, as shown in FIGS. 10B and 10C, are generally under the conditions where an image is displaced by two light beams passing primarily through two different portions of the exit pupil of the lens 1. First, in the shift calculation means 49, image outputs represented with broken lines in FIGS. 10A to 10C, that is, a first image formed by a light beam passing through the rear half portion of the exit pupil and second image formed by a light beam passing through the front half portion of the exit pupil, which portions are divided by a plane including the optical axis 2 and parallel to the sheet surface in FIG. 6, are determined in the direction or sense of their displacement as follows. Assuming that the first image is a reference, the direction is determined by that in which senses the second image is displaced with respect to the first image. In the determination, the following equation (3) is utilized as a direction or sense determining function F.

$$F = \sum_{m=2}^{n-1} \{|A_{m+1} - B_{m-1}| - |A_{m-1} - B_{m+1}|\} \quad (3)$$

Figure 17:
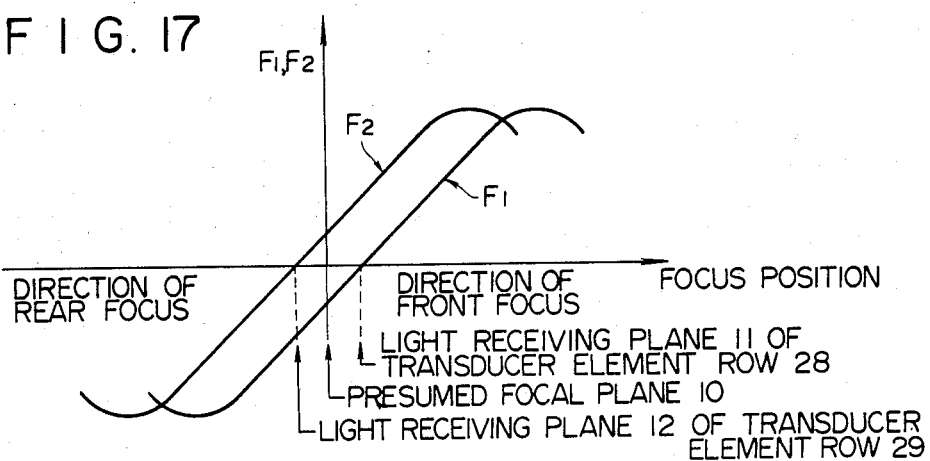
FIG. 17 is a characteristic diagram of direction determining functions $F_1$, $F_2$.

In a flow chart shown in FIG. 16, $F_1$ and $F_2$ represent direction determining functions corresponding to the transducer element rows 28, 29, respectively. The functions $F_1$, $F_2$ are shown in FIG. 17, where the abscissa represents positions of the focus point Pint of the lens 1 and the ordinate is values of the functions $F_1$, $F_2$, and their signs are reversed at the planes 11, 12 between which the presumed focal plane 10 is located. Specifically, in the calculation of the functions $F_1$, $F_2$, first, the direction or sense of the focus point Pint with respect to the light receiving plane position 11 of the row 28 is determined by a sign of the function $F_1$. In the direction or sense of the front focus with respect to the plane 11 of the row 28 wherein the focus point Pint of the lens 1 approaches the taking lens side, $F_1 > 0$ and in the direction of the rear focus wherein the focus point Pint moves further away from the lens 1, $F_1 < 0$. When $F_1 > 0$, in the light receiving plane 11 of the row 28, the direction of shift of a first image formed by a light beam passing through a rear half portion of the exit pupil which is divided by a plane including the optical axis 2 and parallel to the sheet surface is represented as positive with respect to a second image formed by a light beam passing through a front half portion of the exit pupil which is divided by the above mentioned plane and at this time a readout direction of the following shift decision function $G_1$ is assumed to be negative. Likewise, when $F_1 < 0$, the direction of the shift is represented as negative and a readout direction is assumed to be positive. Then, a shift decision function G given by the following equation (4) is calculated.

$$\left. \begin{array}{l} G = \sum_{l=M_1}^{M_2} (|B_l - A_{l \pm m}|) \min \\ m = 0 \text{ to } S \end{array} \right\} \quad (4)$$

In a flow chart shown in FIG. 16, $G_1$, $G_2$ are shift decision functions corresponding to the transducer element rows 28, 29, respectively. In the equation (4), $M_1$, $M_2$ are values indicating positions of transducer elements corresponding to any portions and m is the number of pitches between transducer elements corresponding to shift or displacement over the range of 0 to S. As for the plus and minus signs in $A_{l \pm m}$ which represents $A_{l+m}$ representing an output at the number of $l+m$ or $A_{l-m}$ representing an output at the number of $l-m$, when decided to be the function F in the equation (3) $> 0$, the minus sign is selected in order to read out an output of a transducer element of the first group in the reverse direction and when decided to be $F < 0$, the plus sign is selected in order to read out an output of a transducer element of the first group in the normal direction. Specifically, regarding the transducer element row 28, the readout direction of an output of a transducer element of the first group which is displaced with respect to an output of a transducer element of the second group is determined to take the minus or the plus in accordance with $F_1 > 0$ or $F_1 < 0$, respectively.

Figure 18:
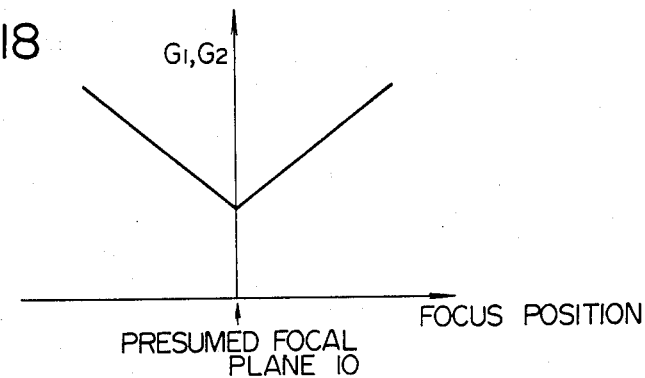
FIG. 18 is a characteristic diagram of shift determining functions $G_1$, $G_2$.

After the readout direction is determined, the function $G_1$ is calculated with respect to outputs of the row 28. The meaning of the equation (4) is that when the output distributions of transducer elements in the first group are successively shifted by the distance of pitch p between transducer elements relative to the output distributions of the transducer elements in the second group, the coincidence between output distributions of transducer elements in the first and the second group becomes highest at a certain distance of the shift and at this time the value of the function G is minimum as shown in FIG. 18. Accordingly, successively substituting 0, 2, . . . , S for m, respective G values are calculated and the function G whose value is minimum among them may be obtained.

From the equation for the function $G_1$ whose value is minimum, the number of pitches between transducer elements $m = S_1'$ corresponding to the shift under the condition where the function $G_1$ is minimum can be obtained. Specifically, with respect to the row 28, the number of pitches $S_1'$ corresponding to the number of transducer elements in which the shift between output distributions of transducer elements in the first and the second group is optimum can be obtained. Then, the image shift $\delta_1$ can be determined by the following equation.

$$\delta_1 = (\text{Sign of } F_1) \times p \times S_1' \quad (5)$$

After the image shift $\delta_1$ on the light receiving plane 11 of the row 28 is determined, the image shift $\delta_2$ on the light receiving plane 12 of the row 29 is similarly calculated. Specifically, after the image shift $\delta_1$ is determined, the direction of shift of the focus point Pint with respect to the plane 12 of the row 29 is decided by reading out a sign of the function $F_2$. When $F_2 > 0$, the direction of image shift is positive and at this time the readout direction of the function $G_2$ is negative. When $F_2 < 0$, the direction of image shift is negative and at this time the readout direction of the function $G_2$ is positive. After the readout direction of the function $G_2$ is determined, the value of the function $G_2$ is calculated and from the equation of $G_2$ whose value is minimum, the number of pitches $m = S_2'$ of transducer elements corresponding to the shift at this time can be obtained. Using the optimum number of pitches $S_2'$ and the pitch p, the image shift $\delta_2$ is determined by the following equation.

$$\delta_2 = (\text{Sign of } F_2) \times p \times S_2' \qquad (6)$$

As such, in the shift calculation means 49, the shift $\delta_1$ of an image formed on the light receiving plane 11 of the row 28 by two light beams passing through different portions of the exit pupil of the taking lens and the shift $\delta_2$ of an image formed on the light receiving plane 12 of the row 29 by two light beams similarly to the above are determined. The outputs of the shift calculation means 49 are fed to the defocused amount calculation means 50 where the defocused amount dF indicative of the shift between the focus point Pint of the image formed through the lens 1 and the presumed focal plane 10 is determined by the equation (2) using the shifts $\delta_1$, $\delta_2$. The defocused amount dF in a digital value is fed from the output terminal of the microcomputer 40 to D/A converter 52 where the digital amount dF is converted into an analog value by a D/A start signal which is sent in synchronism with an output of the calculation means 50 from the control means 42 to the D/A converter 52. When the analog amount dF is fed to the motor drive circuit 53 and the indicator 54, the motor drive circuit 53 drives the motor 55 to move the lens 1 to the in-focus position. The indicator 54 drives a meter or an indicator element based on the sign and the absolute magnitude of the amount dF to indicate a focus condition such as a front, a rear, or an in-focus. In this case, the indicator 54 is connected through the D/A converter 52 to the microcomputer 40 but it may be, when a liquid crystal indicator of the low power consumption is employed, for example, directly connected to the output terminal of the microcomputer 40 or connected through a decoder to the output terminal thereof.

The focus detecting apparatus of the above mentioned embodiment is applied to an auto focus adjusting apparatus. It will be understood, however, that the defocused amount is only indicated by the indicator 54 and the taking lens 1 may be manually moved by a photographer or driven by an electric motor in accordance with the indicated defocused amount until the amount dF becomes zero.

As described above, since the defocused amount can be obtained irrespective of the F number of the taking lens 1, it is possible in a single-lens reflex camera adapted to use an interchangeable lens to readily and rapidly adjust a focus based on the defocused amount.

In the focus detecting apparatus of the above embodiment, the defocused amount dF is determined by the amount of shift of the images formed by two light beams on two transducer element rows 28, 29 which are disposed in positions optically equivalent to the plane positions 11, 12 which are located before and behind the presumed focal plane 10, that is, the shifts $\delta_1$, $\delta_2$ between outputs of transducer elements of the first and the second group in transducer element rows 28, 29.

A second focus detecting method of the invention will be described hereinafter in which the defocused amount dF is determined by calculating the shift $\delta$ of an image on the presumed focal plane 10 based on outputs of two transducer element rows 28, 29 and the shift $\delta'$ of an image which varies in accordance with the F number of the taking lens.

Figure 19:
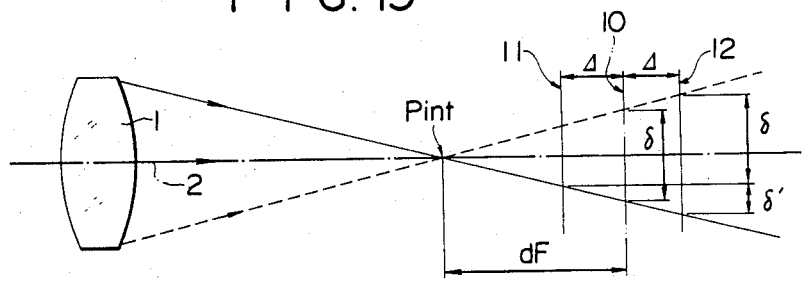
FIG. 19 and FIG. 20 are analytical diagrams for explaining the relation between a defocused amount of a taking lens under out-of-focus conditions and the amounts of image shift formed by two light beams passing through an exit pupil of a taking lens in a second focus detecting method of the invention.
Figure 20:
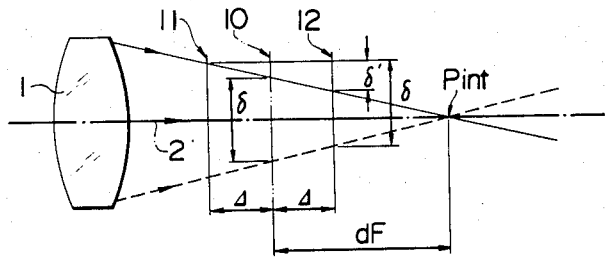

The second focus detecting method also obtains the defocused amount dF in the out-of-focus condition of a front focus or a rear focus as shown in FIGS. 19 and 20, which amount is the shift between the focus point Pint of the taking lens 1 and the presumed focal plane 10. A focus detecting apparatus to which the second focus detecting method is applied has basically the same construction as that of the focus detecting method 25 shown in FIGS. 6, 7A and 7B excepting the fact that both apparatus are only different from each other in the processing for outputs of the transducer element rows 28, 29. Therefore, the second focus detecting apparatus will be described with like reference numerals to like parts in the first focus detecting apparatus 25 shown in FIGS. 6 and 7A. Assume that the F number of the lens 1 is $F_{NO}$ and shift of an image on the presumed focal plane 10 formed by two light beams passing through two portions of the exit pupil of the lens 1, which are, in FIGS. 19 and 20, for example, a first light beam having principal rays shown with solid lines which beam passes through the upper half portion of the exit pupil of the lens 1, and a second light beam having principal rays shown with broken lines which beam passes through the lower portion thereof, which portions are divided by a plane including the optical axis 2 of the lens 1 and perpendicular to the sheet surface, is $\delta$. Then the relation $F_{NO} = dF/\delta$ holds. Accordingly, the defocused amount dF can be determined as follows.

$$dF = F_{NO} \cdot \delta \qquad (7)$$

Figure 1:
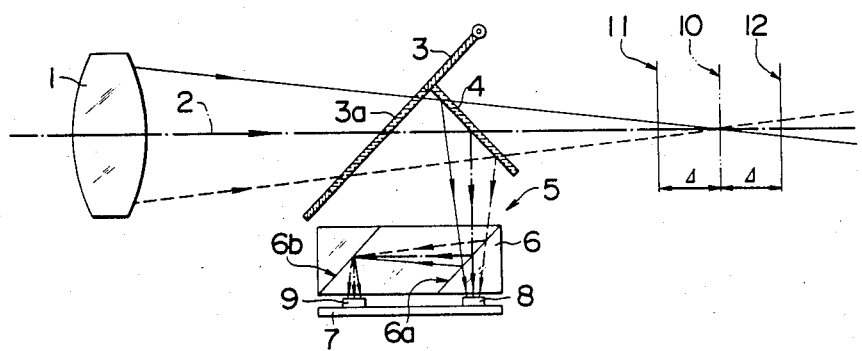
FIG. 1 is a schematic section view illustrating an example of conventional focus detecting apparatus.
Figure 2:
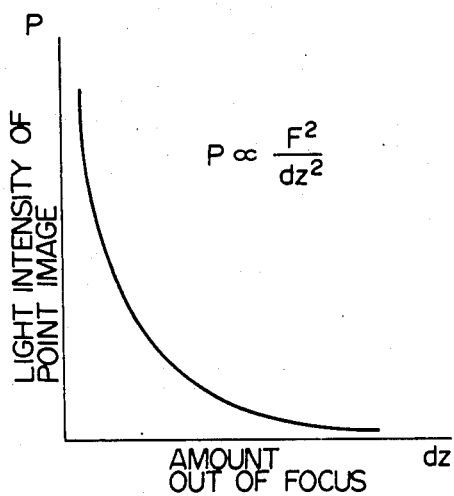
FIG. 2 is a diagram showing the relation between the light intensity of a point image by a taking lens and the amount out of focus in the focus detecting apparatus illustrated in FIG. 1.
Figure 3:
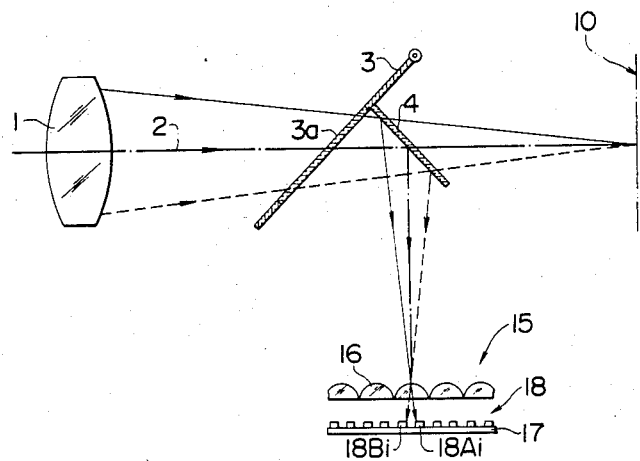
FIG. 3 is a schematic section view illustrating another example of conventional focus detecting apparatus.
Figure 4:
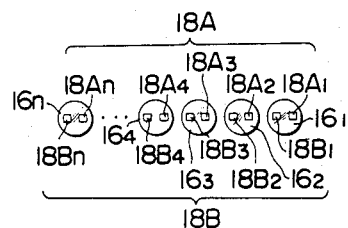
FIG. 4 is a plan view of photoelectric transducer element groups in the focus detecting apparatus illustrated in FIG. 3.
Figure 5:
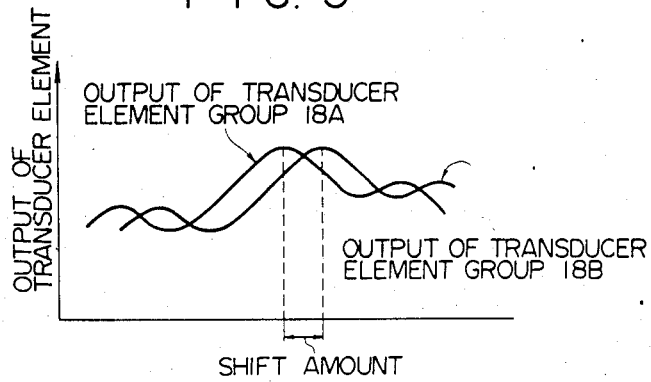
FIG. 5 is a diagram of the output distributions of two photoelectric transducer element groups in the focus detecting apparatus illustrated in FIG. 3.
Figure 21:
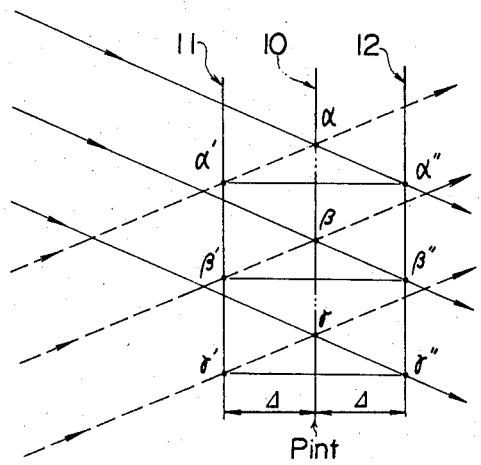
FIGS. 21, 22 and 23 are analytical diagrams for explaining shift in a focal position of a taking lens and shift between two photoelectric transducer element rows which is caused by two light beams.

The shift $\delta$ on the presumed focal plane 10 can not be directly obtained but, as will be seen from FIGS. 19 and 20, is substantially equal to the shift between a first image formed on the light receiving plane 11 by a first light beam having principal rays in a first half portion and a second image formed on the light receiving plane 12 by a second half beam having principal rays in a second half portion, which portions are divided by a plane including the optical axis 2 of the lens 1. This fact will be further analyzed in detail with reference to FIGS. 21 to 23. In the in-focus condition shown in FIG. 2, giving attention to light beams passing through image positions $\alpha$, $\beta$, $\gamma$ on the presumed focal plane 10, positions of images on the plane 11 which are formed by a first light beam having primary rays in the lower portion of the optical axis 2 and which have light intensity distributions similar to those of the image positions $\alpha$, $\beta$, $\gamma$ are $\alpha'$, $\beta'$, $\gamma'$, respectively. Likewise, positions of images on the plane 12 which are by a second light beam having primary rays in the upper portion of the optical axis 2 and which have light intensity distributions similar to those of the image positions $\alpha$, $\beta$, $\gamma$ are $\alpha''$, $\beta''$, $\gamma''$. These image positions $\alpha'$, $\alpha''$; $\beta'$, $\beta''$; $\gamma'$, $\gamma''$ are displaced relative to image positions $\alpha$, $\beta$, $\gamma$ on the presumed focal plane along the direction perpendicular to the optical axis 2 and their displacements within a range not far from the optical axis 2 are in the same sense and substantially equal.

Figure 22:
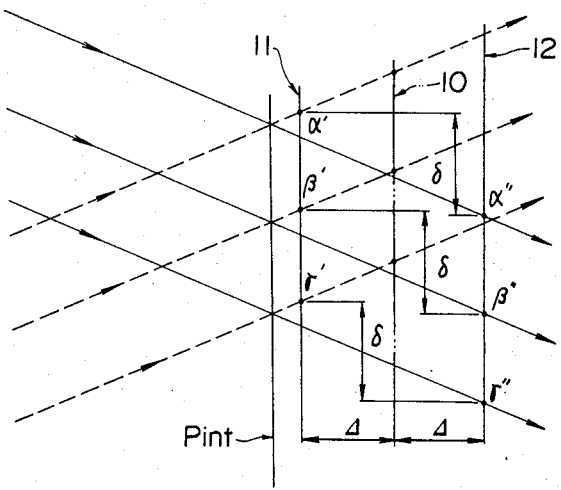
Figure 23:
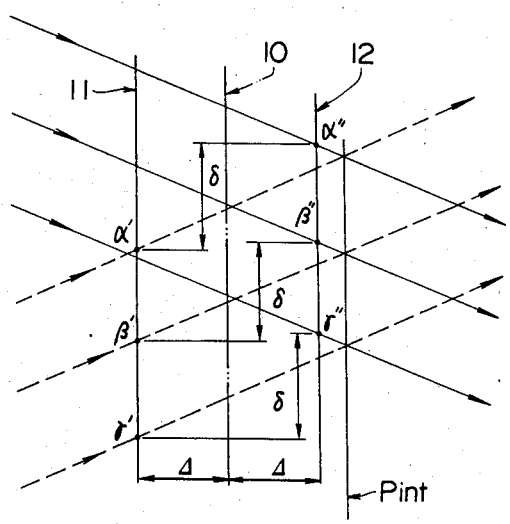

In contradistinction to this, in a front focus condition shown in FIG. 22 and a rear focus condition shown in FIG. 23, positions $\alpha'$, $\beta'$, $\gamma'$ of images on the plane 11 which are formed by a first light beam having primary rays in the lower portion of the optical axis 2 and positions $\alpha''$, $\beta''$, $\gamma''$ of images on the plane 12 which are formed by a second light beam having primary rays in the upper portion of the optical axis 2 are displaced from each other in the opposite senses along the direction perpendicular to the optical axis 2 and their displacement $\delta$ are substantially equal to the displacement of an image on the presumed focal plane 10 by the first and the second light beams. The displacement $\delta$ is in proportion to the defocused amount dF within a range not far from the optical axis 2.

As such, since the displacement of an image on the presumed focal plane 10 formed by the first and the second light beam is substantially equal to the shift between a first image on the plane 11 formed by the first light beam and a second image on the plane 12 formed by the second light beam, the displacement $\delta$ can be determined, for example, by producing outputs of transducer elements $28A_1$ to $28A_n$ in the first group in the row 28 which primarily receive the first light beam, producing outputs of transducer elements $29B_1$ to $29B_2$ in the second group in the row 29 which primarily receive the second light beam, comparing output distributions of these transducer element groups by successively shifting in a manner similar to the description of the first embodiment and then obtaining the number of pitches between transducer elements m corresponding to the displacement $\delta$ and the distance of pitch p in the arrangement thereof. Specifically, assuming that a shift decision function for obtaining the displacement $\delta$ is $G_0$, the following equation holds in a manner substantially similar to the equation (4).

$$\left.\begin{array}{l} G_0 = \sum_{l=M_1}^{M_2} (|28A_l - 29B_{l\pm m}|) \text{ min} \\ \\ m = 0 \text{ to } S \end{array}\right\} \quad (8)$$

Accordingly, the number of pitches between transducer elements $m = S_0$ corresponding to the displacement $\delta$ is determined from the equation (8) in which the value of $G_0$ is minimum. Hence, the displacement $\delta$ is determined as follows.

$$\delta = p \times S_0 \quad (9)$$

In the equation (8), $28A_l$ represents the lth output among outputs of transducer elements of the first group in the row 28 and $29B_{l\pm m}$ represents the l±m-th output among outputs of transducer elements of the second group in the row 29.

Furthermore, as will be obvious from FIGS. 19 and 20, assuming that shift between a first image formed on the plane 11 by a first light beam having primary rays in a first half portion which is divided by a plane including the optical axis 2 and a second image formed on the plane 12 by the first light beam is $\delta$, the following relation between the shift $\delta'$ and the F number of the taking lens 1 holds.

$$F_{NO} = \Delta/\delta' \quad (10)$$

Accordingly, it will be seen that the F number of the lens 1 may be known by obtaining the shift 67'. The shift $\delta'$ can be determined by producing outputs of the transducer element rows 28, 29, for example, transducer elements of the first group $28A_1$ to $28A_n$ and $29A_1$ to $29A_n$, which primarily receive a light beam passing through a first half portion of the exit pupil of the lens 1, comprising output distrbutions of the rows 28, 29 by successively shifting in a manner similar to the aforesaid case that the displacement $\delta$ is determined, and then obtaining the number of transducer elements m corresponding to the shift $\delta'$ and the distance of pitch p of the arrangement. Specifically, since positions of the transducer element rows 28, 29 are optically equivalent to the planes 11, 12 between which the presumed focal plane 10 is located (see FIG. 6), the condition where these rows 28, 29 are placed in these optically equivalent positions is as shown in FIG. 24. The positions where a light beam passing through the lower half portion of the exit pupil which is divided by the optical axis 2 of the lens 1 (the front half portion which is divided by the sheet surface in FIG. 6) impinges upon transducer elements $29A_1$ to $29A_n$ of the first group in the row 29 is displaced in the positive direction relative to the positions where the light beam impinges upon transducer elements $28A_1$ to $28A_n$ of the first group in the row 28. Likewise, the positions where a light beam passing through the upper half portion of the exit pupil divided by the optical axis 2 of the lens 1 (the rear side portion divided by the sheet surface in FIG. 6) impinges upon transducer elements $29B_1$ to $29B_n$ of the second group in the row 29 is displaced in the negative direction relative to the positions where the light beam impinges upon transducer elements $28B_1$ to $28B_n$ of the second group in the row 28. Hence, the shift decision function G' for obtaining the shift $\delta$ is as follows.

$$\left.\begin{array}{l} G' = \sum_{l=M_1}^{M_2} (|28A_l - 29A_{l+m}|) \text{ min} \\ \\ G' = \sum_{l=M_1}^{M_2} (|28B_l - 29B_{l-m}|) \text{ min} \\ \\ m = 0 \text{ to } S' \end{array}\right\} \quad (11)$$

Thus, the optimum number of pitch $m = S'$ is obtained from the equation of G' whose value is minimum. Then, the shift $\delta$ is calculated as follows.

$$\delta' = p \times S' \quad (12)$$

In the equation (11), $29A_{l+m}$ represents an output of the l+m th transducer element which is shifted by the number m of transducer elements from the lth one of the first group in the row 29 in the positive direction and $29B_{l-m}$ represents an output of the l−m th transducer element which is shifted by the number m of transducer elements from the lth one of the second group in the row 29.

Thus, in the focus detecting apparatus to which the second focus detecting method is applied, the defocused amount dF can be determined by obtaining the shifts $\delta$, $\delta'$ calculating in a manner similar to the case in the first focus detecting apparatus without the influence a difference in F number even when the F number changes by interchanging the lens 1. The shift $\delta'$, as shown in the equation (10), varies with the F number: $F_{NO}$ but undergoes little change under an out-of-focus condition. In addition, since the F number of a normal camera lens assumes a discrete value such as 1.4, 2.8, 4.0, ..., there is no problem in obtaining $F_{NO}$ even when there is a little error in the shift $\delta'$. Accordingly, after a series of F numbers of a lens are previously stored, an F number among them which is nearest to the F number obtained by the above mentioned calculation may be employed by selectively reading out it.

In the above embodiment, the outputs of transducer elements which are employed to obtain the shifts $\delta$, $\delta'$, as will be seen from the equations (8)(11), are outputs of transducer elements $28A_1$ to $28A_n$ of the first group in the row 28, outputs of transducer elements $29A_1$ to $29A_n$ of the first group in the row 29 and outputs of transducer elements $29B_1$ to $29B_n$ of the second group in the row 29. However, it is to be understood that the invention is not limited to these outputs of transducer elements as follows. In place of outputs of transducer elements $29B_1$ to $29B_n$ of the second group of the row 29, it may be possible to employ outputs of transducer elements $28B_1$ to $28B_n$ of the second group of the row 28. In addition, in place of outputs of transducer elements $28A_1$ to $28A_n$ of the first group of the row 28, it may be possible to employ outputs of transducer elements $28B_1$ to $28B_n$ of the second group in the row 28. After all, the shifts $\delta$, $\delta'$ can be obtained from outputs of transducer elements of the first and the second group in either one of the transducer element rows 28, 29 and outputs of transducer elements of the first or the second group in the other one of the transducer element rows 28, 29. Accordingly, as will be seen from the foregoing, the positional relationship between the shift generating optical system 30 and the transducer element rows 28, 29 in the second focus detecting apparatus may of course be the same as that shown in FIG. 7A but it is possible to omit transducer elements of the first or the second group in either of the transducer element rows 28, 29 as long as the defocused amount dF is obtained.

After shift between the presumed focal plane 10 and the focal point Pint of the lens 1, that is, the defocused amount dF, is determined as described above, the motor 55 is driven in accordance with the defocused amount dF in a manner similar to the first embodiment and the lens 1 moves toward the in-focus position by the distance corresponding to the defocused amount dF.

After the lens 1 has moved to the in-focus point in accordance with the defocused amount, if it is inspected whether or not the focus point Pint of the lens 1 is within a predetermined in-focus range employing an image blur evaluation function for evaluating the sharpness of an image or an image shift evaluation function for evaluating the shift condition of an image, the accuracy of detecting the in-focus position will be further improved. Therefore, the second embodiment of the invention achieves the focus detection employing these evaluation functions. In the first embodiment, the description is limited to only operations in which the defocused amount dF is determined and the lens 1 moves in accordance with the defocused amount dF. However, to further improve the accuracy of in-focus, the focus detection may be performed combining the image blur detecting method and the image shift detecting method.

This will be described hereinafter with reference to the focus detecting apparatus of the second embodiment.

When the result that the lens 1 moves in accordance with the defocused amount dF and an inspection of the in-focus condition is performed employing evaluation functions in insufficient in the in-focus condition, the inspection is repeated moving the lens 1 little by little stepwise until the focal point Pint goes into the in-focus position and thus the lens 1 is finally positioned in the in-focus position.

To this end, the evaluation of the sharpness of an image on the presumed focal plane 10 is achieved comparing the sharpnesses of the images on both transducer element rows 28, 29 and the evaluation of the image shift is achieved based on outputs of both transducer element rows 28, 29. Specifically, as the shift evaluation function F, the following expressions, for example, may be employed.

$$Y = \sum_{i=2}^{n-1} \{|28A_{i+1} - 29B_{i-1}| - |28A_{i-1} - 29B_{i+1}|\} \quad (13)$$

or $$Y = \sum_{i=2}^{n-1} \{|29A_{i+1} - 28B_{i-1}| - |29A_{i-1} - 28B_{i+1}|\} \quad (14)$$

As will be seen from these expressions (13) (14), the shift evaluation function Y can be determined, in a manner similar to the case where the aforesaid shift $\delta$ is determined, combining outputs of transducer elements $28A_1$ to $28A_n$ of the first group in the row 28 which receive a first light beam incident upon the light receiving plane 11 and outputs of the transducer elements $29B_1$ to $29B_n$ of the second group in the row 29 which receive a second light beam incident upon the light receiving plane 12 or combining outputs of transducer elements $29A_1$ to $29A_n$ of the first group in the row 29 which receive a first light beam incident upon the plane 12 and outputs of transducer elements $28B_1$ to $28B_n$ of the second group in the row 28 which receive a second light beam incident upon the plane 11.

As examples of the image blur evaluation function, the following expressions of an image blur evaluation function Ba which detects the sharpness of an image on the row 28 and another image blur evaluation function Bb which detects the sharpness of an image on the row 29 may be used.

$$Ba = |(28A_i + 28B_i) - (28A_{i-1} + 28B_{i-1})|\max \quad (15)$$

$$Bb = |(29A_i + 29B_i) - (29A_{i-1} + 29B_{i-1})|\max \quad (16)$$

where i=2 to n.

As shown in FIG. 25, the shift evaluation function $Y = 0$ under the in-focus condition where the focus point is on the presumed focal plane 10, and $Y > 0$ and $Y < 0$ under a front focus and a rear focus condition, respectively. The focus detection method by shift of an image can effectively detect a focus condition substantially over the wide range dy of a total movement of the lens 1 and are suitable for detecting the focus of an image having particularly low frequency components. In the embodiment, therefore, while the lens 1 moves in accordance with the defocused amount dF, the evaluation value Y is also detected and the sense of moving the lens 1 is determined by the sign of the function value Y. At the same time, to finally detect the focus of an image having low frequency components based on the evaluation value Y, a predetermined threshold value $L_1$ is set. In contradistinction to this, the image blue evaluation functions Ba and Bb, as shown in FIG. 26, are maximum at the light receiving plane positions 11, 12, that is, when the focus position is on the transducer element rows 28, 29. In addition Ba−Bb=0, Ba−Bb>0 and Ba−Bb<0 under an in-focus, a front focus and a rear focus, respectively. The focus detection method based on the sharpness of an image by comparison of these evaluation values Ba, Bb is narrow in its range of the detection but is suitable for an image having particularly high frequency components. Hence, in the embodiment, a predetermined threshold value $L_2$ is set to finally detect the in-focus condition by detecting the sharpness of an image having high frequency components so that the detection of the in-focus condition is achieved when Ba+Bb>$L_2$.

Furthermore, the decision of the in-focus condition is made when $|Y|\leq H_1$ by setting the range of the in-focus condition $H_1$ ($H_1<L_1$) to the evaluation value Y and when $|Ba-Bb|\leq H_2$ by setting the range of the in-focus condition $H_2(H_2>>L_2)$ to the evaluation value ⊕Ba−Bb| (these are not shown). Thus, in the embodiment, to improve the reliability and the accuracy of the final focus detection after the lens 1 has moved in accordance with the defocused amount dF, a threshold value $L_3$ is set to the evaluation values Ba and Bb and when $|Y|<L_1$ and either of Ba and Bb is less than $L_3$, a decision is made to be impossible to inspect the focus condition and the further focus detection will not be conducted.

Figure 27:
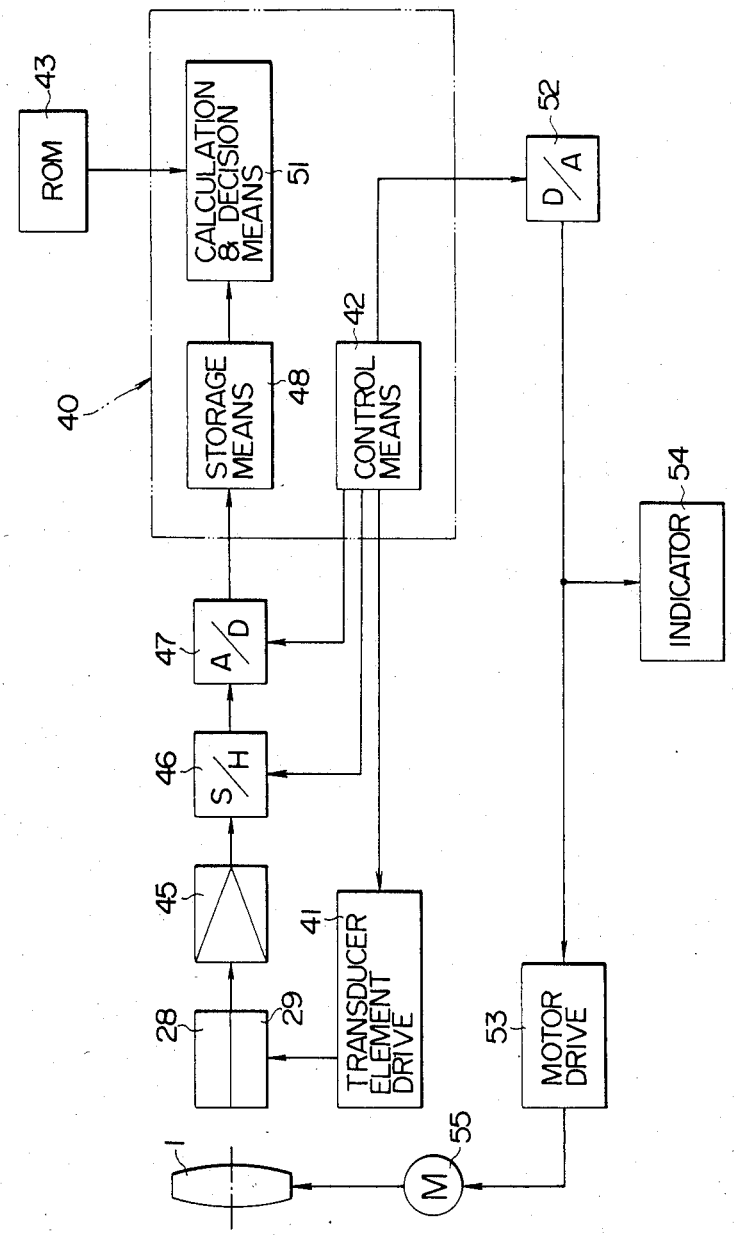
FIG. 27 is a block diagram of an electric circuit of the focus detecting apparatus to which the second focus detecting method of the invention is applied.
Figure 28:
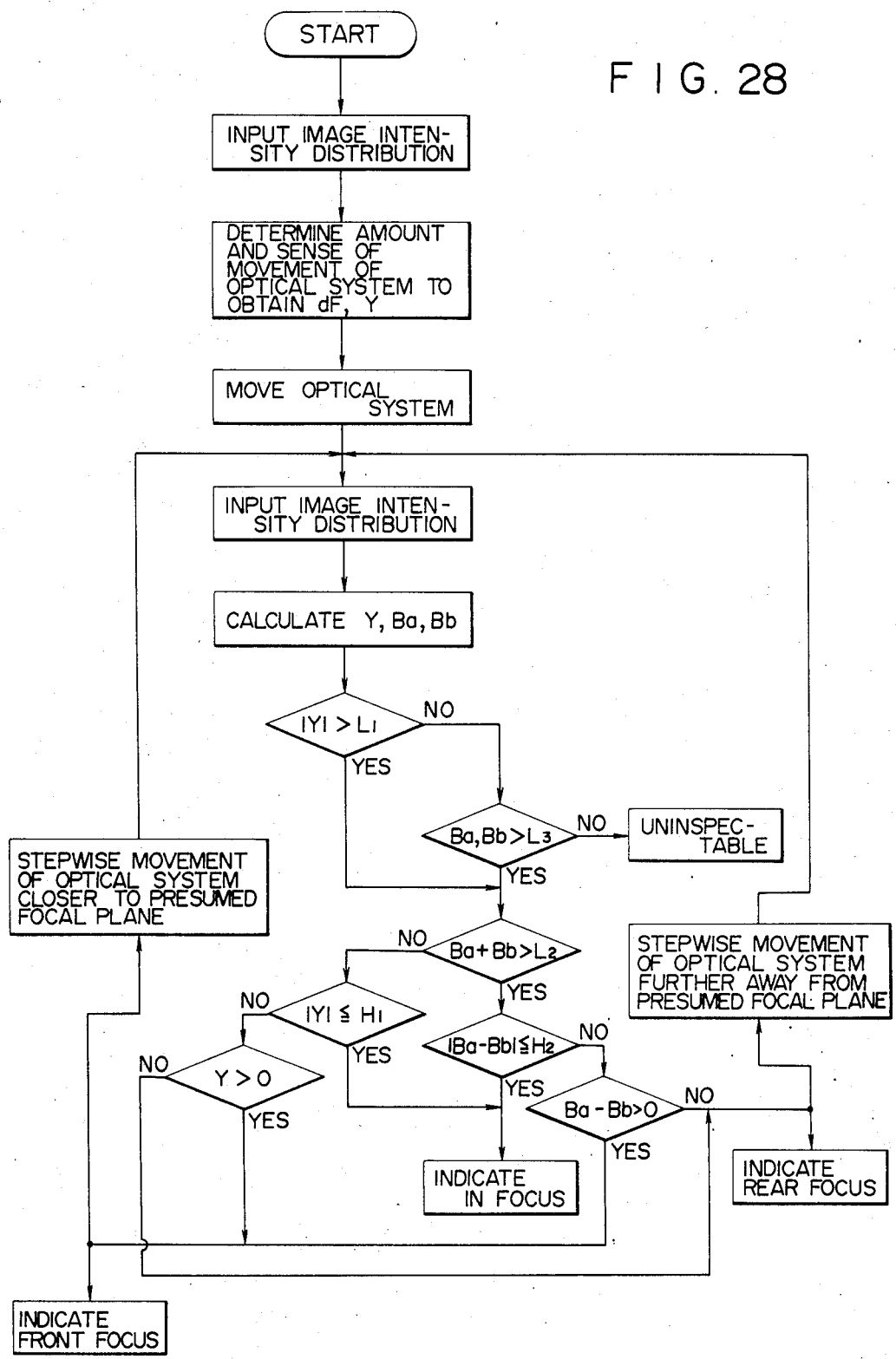
FIG. 28 is a flow chart for explaining operations of the electric circuit of the focus detecting apparatus illustrated in FIG. 27.

The operations of the focus detecting apparatus of the second embodiment will be described hereinafter with reference to an electric circuit shown in FIG. 27 and a flow chart shown in FIG. 28. The electric circuit shown in FIG. 27 is substantially similar to that shown in FIG. 14. A calculation and decision means 51 within a microcomputer 40 comprises a shift calculation means for calculating shifts δ and δ', a defocused amount calculation means for calculating the defocused amount dF from outputs of the shift calculation means and a decision means for determining the focus condition calculating the image blur evaluation functions Ba, Bb, the shift evaluation function Y and the like.

First, in a manner similar to the description of the first embodiment, after the image intensity distributions on the transducer element rows 28, 29 have been stored in the storage means 48, the distance of movement of the lens to the in-focus condition and the sense of the movement are calculated and determined by obtaining the defocused amount dF and the shift evaluation function Y based on these image intensity distributions within the calculation and decision means 51. Based on the results, a motor 55 moves the lens 1 through a motor drive circuit 53. Subsequently, to inspect whether or not the lens 1 thus moved is in the in-focus condition, the image intensity distributions on the transducer element rows 28, 29 in the position of the lens 1 are inputted into the storage means 42 to calculate the evaluation values Y, Ba and Bb within the calculation and decision means 51. Thereafter, the inspection is conducted, first, judging $|Y|>L_1$ and if so, next, judging Ba+Bb>$L_2$, and if so, that is, when an image have high frequency components, detecting an image blur with the comparison of these Ba, Bb. Specifically, when $|Ba-Bb|\leq H_2$, the decision is made to be in-focus to indicate it in the indicator 54. When Ba−Bb>0, the decision is made to be a front focus to indicate it in an indicator apparatus 54 and to move the lens 1 stepwise closer to the presumed focal plane 10 through the motor drive circuit 53 and the motor 55. Thus, the inspection is repeated until the relation $|Ba-Bb|\leq H_2$ is satisfied. Similarly, when Ba−Bb<0, the decision is made to be a rear focus to indicate it in the indicator apparatus 54 and to move the lens 1 stepwise further away from the presumed focal plane 10 through the motor drive circuit 53 and the motor 55. Thus the inspection is repeated until the relation $|Ba-Bb|\leq H_2$ is satisfied. In addition, when $|Y|>L_1$ and Ba+Bb<$L_2$, that is, when an image has low frequency components, the inspection is conducted detecting shift of the image with the evaluation value Y. Specifically, when $|Y|\leq H_1$, the decision is made to be in-focus to indicate it in the indicator apparatus 54. When Y>0, the decision is made to be a front focus to indicate it in the indicator apparatus 54 and to move the lens 1 stepwise closer to the presumed focal plane 10 through the motor drive circuit 53 and the motor 55. Thus, the inspection is repeated until the relation $|Y|\leq H_1$ is satisfied. Similarly, when Y<0, the decision is made to be a rear focus to indicate it in the indicator apparatus 54 and to move the lens 1 stepwise further away from the presumed focal plane 10 through the motor drive circuit 53 and the motor 55. Thus, the inspection is repeated until the relation $|Y|\leq H_1$ is satisfied. Furthermore, when $|Y|<L_1$, subsequently the decision is made to be Ba>$L_3$ and Bb>$L_3$. When both relations are satisfied, the inspection employing the image blur or the image shift is conducted judging Ba+Bb>$L_2$. In addition, whether either Ba≦$L_3$ or Bb≦$L_3$, the decision is made to be impossible to inspect and the further focus detection is stopped. The condition where the inspection is impossible may be indicated in the indicator apparatus 54.

According to the focus detecting apparatus of the embodiment described above, the amount and the sense of movement of the lens 1 toward the in-focus condition are determined based on the defocused amount dF and the shift evaluation value Y so that the adjustment of the in-focus condition can be rapidly made over the wide range. Also, the shift evaluation value Y is determined by detecting the image blur on the transducer element rows 28, 29 under the in-focus condition so that the accuracy of the in-focus condition with the image shift can be improved. In addition to this, the final in-focus adjustment is made combining the image shift method and the image blur method so that the in-focus adjustment can be achieved in accordance with a condition of an object to be photographed with a high accuracy.

It should be understood that the present invention is not limited to only the above mentioned embodiments and a variety of modifications and variations can be made.

Figure 29:
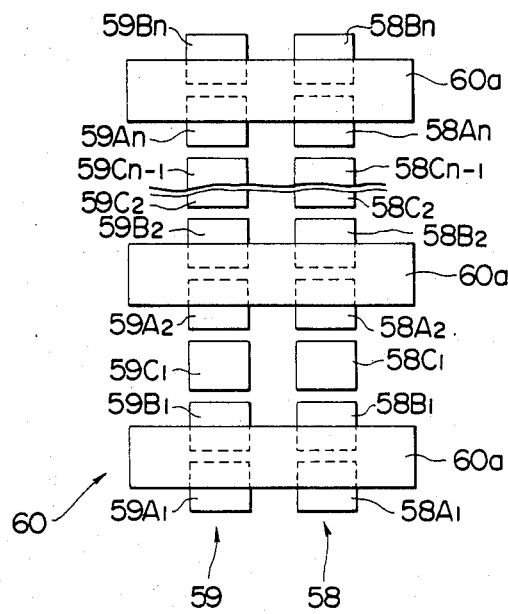
FIGS. 29 and 30 are plan views showing other examples of positional relations between a shift generating optical system and photoelectric transducer element rows in the focus detecting apparatus to which the second focus detecting method is applied.

By way of example, in addition to the arrangement comprising the shift generating optical system 30 and the transducer element rows 28, 29 shown in FIGS. 7A and 7B, another arrangement as shown in FIG. 29 may be employed. Specifically, the spaces between masks 60a of a shift generating optical system 60 and between successive series of sets comprising each pair of a first group of transducer elements $58A_1$ to $58A_n$, $59A_1$ to $59A_n$ and each pair of a second group of transducer elements $58B_1$ to $58B_n$, $59B_1$ to $59B_n$ which face the masks 60a are increased so that a third group of transducer elements $58C_1$ to $58C_{n-1}$, $59C_1$ to $59C_{n-1}$ which receive two light beams passing through two different portions of the exit pupil of the lens 1 respectively, may be successively interposed within both sets. In this case, the sharpnesses of images on the transducer element rows 58, 59 can be determined by outputs of transducer elements $58C_1$ to $58C_{n-1}$, $59C_1$ to $59C_{n-1}$ of the third group and the following expressions, for example, may be employed as respective image blur evaluation functions Ba, Bb.

$$Ba = |58C_{i-1} - 58C_i| \max \quad (17)$$

$$Bb = |59C_{i-1} - 59C_1| \max \quad (18)$$

where $i = 2$ to $(n-1)$.

Figure 30:
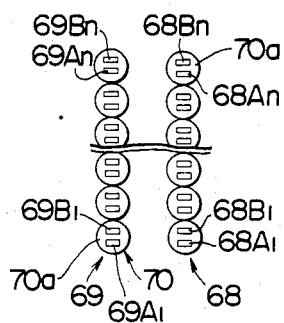

With this arrangement, the coefficient of utilization of light when the sharpness of an image is detected is increased and the signal-to-noise ratio is improved. Also, since the insensible zone for an image blur is insignificant, the accuracy of the in-focus condition with the image blur detecting method can be improved. The reason is that the spread of a point image which is formed on each of the transducer element rows 58, 59 when in the proper in-focus condition is larger than the pitch between transducer elements $58C_1$ to $58C_{n-1}$, $59C_1$ to $59C_{n-1}$ of each transducer element group which pitch is determined by the Nyquist frequency so that it extends over successive transducer elements in each group. The same effects regarding the insensible zone can be also expected to the image shift method. In addition, as shown in FIG. 30, a further arrangement may be used in which transducer element rows 68, 69 which are arranged similarly to the transducer element rows 28, 29 are employed and a shift generating optical system 70 is constructed in such a manner that a series of minute fly-eye lens 70a are arranged in lines over each pair from a first transducer element group $68A_1$ to $68A_n$, $69A_1$ to $69A_n$ and a second transducer element group $68B_1$ to $68B_n$, $69B_1$ to $69B_n$. In this case, no light is shaded as in the case where a striped mask plate is employed so that the coefficient of utilization of light can be increased.

Furthermore, in the embodiments shown in FIGS. 29, 30, the transducer element rows 58, 59 or 68, 69 are arranged so as to receive two light beams passing through two separated portions of the exit pupil of the lens 1. However, it will be understood that, as described above, either of transducer element rows 58, 59; 68, 69 may be arranged so as to primarily receive a light beam passing through only one portion of the two.

Still furthermore, while in the foregoing embodiments the shift evaluation value Y is calculated and the sense of movement of the lens 1 in accordance with the defocused amount dF is determined by the sign of the value Y, it may be possible to determine the sense of the movement in calculating the shift δ while the defocused amount dF is obtained. In addition, the in-focus adjustment in the embodiment is not limited to an automatic operation but may be manually conducted. In this case, it is possible to indicate the defocused amount dF or the distance to move the lens 1 based on the amount dF and the sense of the movement with a length of the arrow indicating the sense.

While the focus detecting apparatus of the above embodiment is described in which to determine the shift δ of an image on the presumed focal plane 10 a first light beam passing through a first portion of the exit pupil of the lens impinges upon a first transducer element row and a second light beam passing through a second portion of the exit pupil impinges upon a second transducer element row, a further focus detecting apparatus which is preferable to primarily and separately receive each of two light beams passing through two divided portions of the exit pupil upon respective transducer element rows will be described hereinafter.

Figure 31:
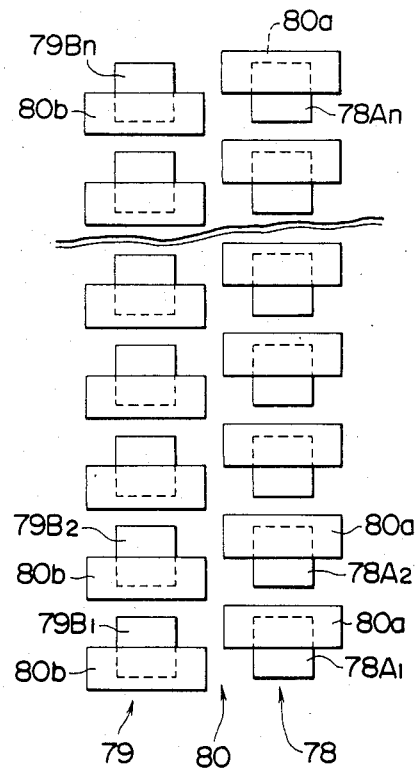
FIG. 31 is a plan view showing an example of positional relations between a shift generating optical system and photoelectric transducer element rows in the focus detecting apparatus to which a third focus detecting method of the invention is applied.

In this case, since the shift δ can not be obtained, the defocused amount dF is not determined and therefore the focus detection is performed employing the shift evaluation function and the image blur evaluation function. In a focus detecting apparatus of a third embodiment to which this method is applied, the positional relationship between the shift generating optical system and the transducer element rows is shown in FIG. 31. Specifically, a first transducer element row 78 which is arranged in a position equivalent to the plane position 11 close to the taking lens 1 by a given distance Δ from the presumed focal plane 10 includes n transducer elements $78A_1$ to $78A_n$ of a first group and a second transducer element row 79 which is arranged in a position equivalent to the plane position 12 far away to the lens 1 by the distance Δ from the plane 10 includes n transducer elements $78B_1$ to $79B_n$ of a second group. The shift generating optical system 80 comprises n masks 80a each of which faces respective transducer elements $78A_1$ to $78A_n$ of the row 78 and n masks 80b each of which faces respective transducer elements $78B_1$ to $79B_n$ of the row 79. The masks 80a, 80b are arranged so as to assume the positional relationship therebetween shifted by a half cycle period in the direction of row lines of transducer elements. Accordingly, when two light beams passing through two portions of the exit pupil of the lens 1 reach the shift generating optical system 80, transducer elements $78A_1$ to $78A_n$ of the row 78 receive primarily and selectively one of the two light beams and elements $78B_1$ to $79B_n$ of the row 79 receive primarily and selectively the other thereof.

Accordingly, with outputs of transducer elements of the rows 78, 79, the following expression, for example, is given as the shift evaluation function Y.

$$Y = \sum_{i=2}^{n-1} \{|78A_{i+1} - 79B_{i-1}| - |78A_{i-1} - 79B_{i+1}|\} \quad (19)$$

The function Y is substantially the same as the shift evaluation function shown by the expression (13). Accordingly, it is clear that the function Y of the expression (19) also varies as shown in FIG. 25 in accordance with the movement of the focal point of the lens 1. With the function Y, Y=0 under the in-focus condition where the focal point of the lens 1 coincides with the presumed focal plane 10 and Y>0 or Y<0 under a front focus or a rear focus condition, respectively. Thus, it is as stated above that the focus condition can be detected.

To achieve the focus detection based on the sharpness of an image with outputs of transducer elements of the rows 78, 79, the following expressions, for example, may be used as the image blur evaluation functions Ba, Bb for the rows 78, 79.

$$Ba = |78A_i - 78A_{i-1}| \max \quad (20)$$

$$Bb = |79B_i - 79B_{i-1}| \max \quad (21)$$

The relations between the image blur evaluation functions, Ba−Bb=0, Ba−Bb>0 and <0 are decided as an in-focus, a front focus and a rear focus, respectively. Thus, the focus condition can be detected.

Thus, in the focus detecting apparatus employing outputs of the rows 78, 79, the accuracy in the focus detection can be also improved combining the image shift and the image blur detection methods.

Figure 32:
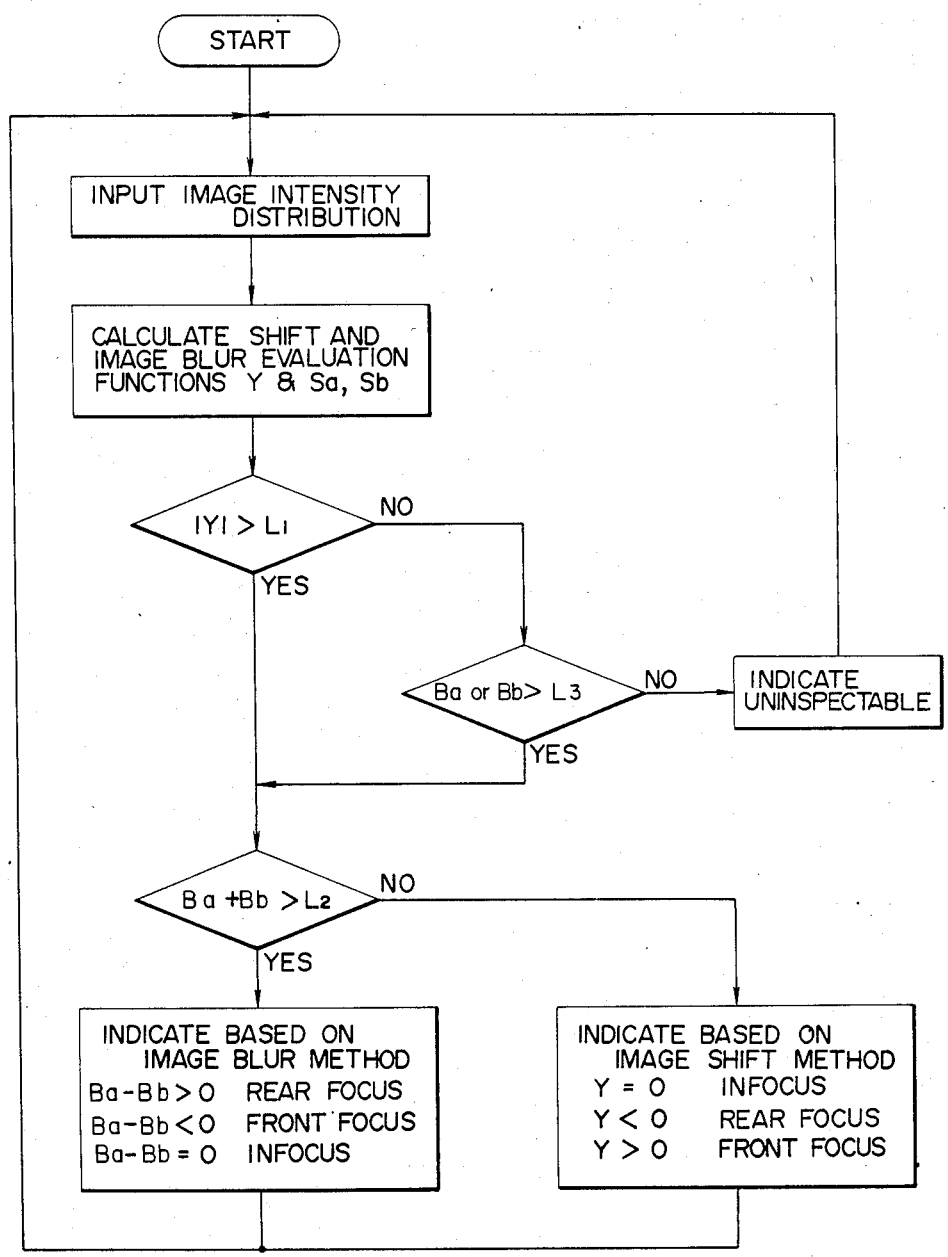
FIG. 32 is a flow chart for explaining operations of the focus detecting apparatus to which the third method of the invention is applied.

The operations of the above mentioned focus detecting apparatus will be described hereinafter with reference to a flow chart shown in FIG. 32. An electric circuit of the apparatus is substantially the same as that shown in FIG. 27 and will be explained therewith. First, after outputs of the rows 78, 79 are stored in the storage means 48, the shift and the image blur evaluation functions Y and Ba, Bb of the expressions (19) to (21) are determined based on the image intensity distributions on the rows 78, 79 within the calculation and decision means 51. Since the function Y, as described above with reference to FIG. 25, can indicate the focus condition over the wide range dy of movement of the lens 1, the decision of the focus condition is first performed employing the function Y. In this case, there is a likelihood that a spurious in-focus condition is detected since the value of function Y is approximately zero, as is seen from FIG. 25, at a position far away from the position in in-focus condition where the focus position of the lens 1 coincides with the presumed focal plane 10. To prevent this, the value $|Y|$ compares with a predetermined threshold value $L_1$. When $|Y|<L_1$, the decision is achieved whether the image blur evaluation values Ba, Bb as indicating image contrasts are at a level capable of detecting the focus condition by the image blur detection method, which level is given by a threshold value $L_3$. When the value Ba, Bb<$L_3$, an undetectable indication is given. When Ba, Bb>$L_3$, the value Ba+Bb is compared with a threshold value $L_2$ (see FIG. 26) for judging whether the focus position is within a range d capable of detecting the in-focus condition by the image blur detection method. Also, when $|Y|>L_1$, Ba+Bb is compared with the value $L_2$. When Ba+Bb>$L_2$, the focus condition is detected with the image blur detection method which is excellent in the accuracy of detection to an image having high frequency components assuming that the focus position is within a detectable range d of an image blur. Specifically, when Ba−Bb=0, Ba−Bb<0 and Ba−Bb<0, comparing Ba with Bb, an in-focus, a rear focus and a front focus condition are detected and indicated, respectively. When Ba+Bb<$L_2$, the focus condition is detected by the shift detection method which is also excellent in the accuracy of detection to an image having low frequency components. Specifically, the detection is performed judging by a sign of the function Y in which when Y=0 the condition is in-focus and when Y<0 and Y>0, the condition is in a rear and a front focus, respectively.

Figure 33:
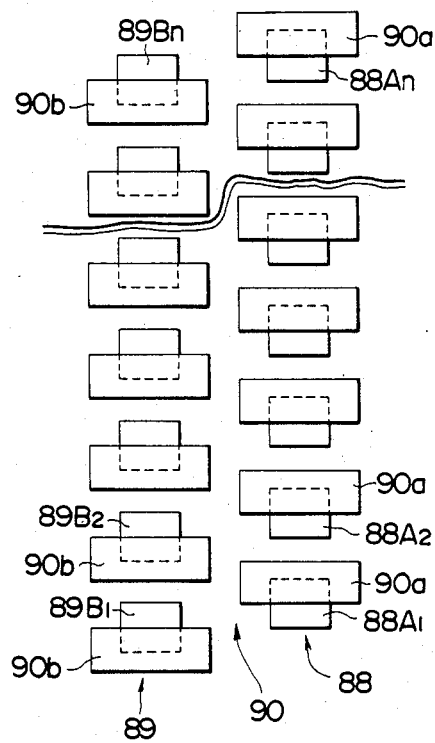
FIGS. 33 and 34 are plan views showing other examples of positional relations between a shift generating optical system and photoelectric transducer element rows in the focus detecting apparatus to which the third method of the invention is applied.

It will be understood that in the focus detecting apparatus according to the above mentioned third method, there are modifications also in the positional relationship between the shift generating optical system and two transducer element rows other than that shown in FIG. 31. By way of example, in the arrangement between a shift generating optical system 90 and photoelectric transducer element rows 88, 89 shown in FIG. 33, the positional relationship between n transducer elements $88A_1$ to $88A_n$ of one transducer element row 88 and masks 90a thereover and the other positional relationship between n transducer elements $89B_1$ to $89B_n$ of the other row 89 and masks 90b thereover are maintained in the same manner as in FIG. 31. However, the combination of one transducer element row 88 and the masks 90a is displaced with respect to the combination of the other row 89 and masks 90b along the direction of the row 88 in such a manner that areas where each of pairs of transducer elements $88A_1$, $89B_1$; $88A_2$, $89B_2$; . . . ; $88A_n$, $89B_n$ adjoining each other in two rows 88, 89 are exposed to each of masks 90a, 90b are made equal and light beams incident upon each pair of transducer elements are the divided light beams from the same portion of an image. With such arrangement, images projected on light receiving planes of the rows 88, 89 mutually have similar light intensity distributions so that the improvement in the accuracy of the in-focus detection can be further expected.

Figure 34:
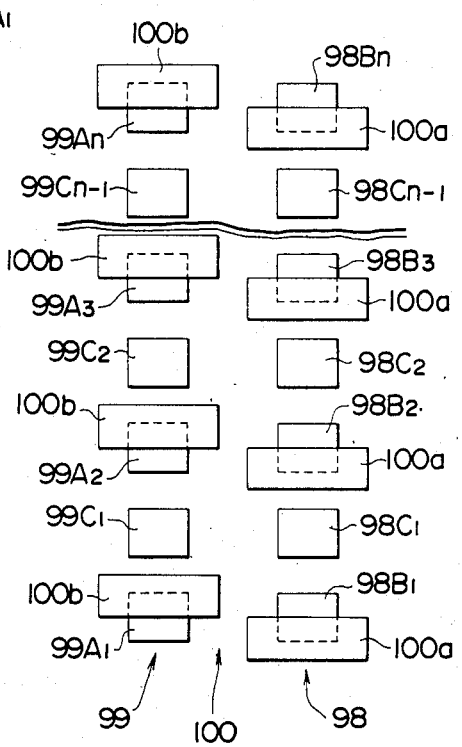

In a still further arrangement of transducer element rows 98, 99 and a shift generating optical system 100 shown in FIG. 34, light beams passing primarily through different portions divided by a plane including the optical axis of the taking lens 1 impinge upon n transducer elements $98B_1$ to $98B_n$ of one row 98 which face masks 100a and other n transducer elements $99A_1$ to $99A_n$ of the other row 99 which face masks 100b, respectively. In addition, each of (n−1) transducer elements $98C_1$ to $98C_{n-1}$ are arranged between adjacent transducer elements of n transducer elements $98B_1$ to $98B_n$ of the row 98 and each of (n−1) transducer elements $99C_1$ to $99C_{n-1}$ are arranged between adjacent transducer elements of n transducer elements $99A_1$ to $99A_n$ of the row 99. While transducer elements $99B_1$ to $99B_n$ and $99A_1$ to $99A_n$ are for the image shift detection, transducer elements $98C_1$ to $98C_{n-1}$ and $99C_1$ to $99C_{n-1}$ are for the image blur detection and receive two light beams passing through the different portions of the exit pupil without the two light beams being separated. With such arrangement, since the amount of light incident upon transducer elements $98C_1$ to $98C_{n-1}$ and $99C_1$ to $99C_{n-1}$ are increased, the signal-to-noise ratio at the time of the image blur detection is improved and the accuracy of the in-focus detection can be improved by increasing a change in the sharpness of an image.

Furthermore, it is to be noted that a fly-eye lens, pin-hole, light polarization prism, critical angle lens or the like other than the striped mask plate used in the above embodiment can be used as a shift generating optical system.

What is claimed is:

1. A focus detecting method comprising:

arranging light receiving planes of a first and a second photoelectric transducer element row in positions optically equivalent to plane positions which are located before and behind a presumed focal plane of an image forming optical system, respectively;

separating a light beam passing through an exit pupil of said image forming optical system into a first light beam passing primarily through a first half portion of the exit pupil and a second light beam passing primarily through a second half portion of the exit pupil, which portions are divided by a plane including an optical axis of said image forming optical system, by an image shift or displacement generating optical system which is disposed in front of said first and second transducer element rows;

directing one of said first and second light beams to the light receiving plane of at least one of said first and second transducer element rows and directing the other of said first and second light beams to the light receiving plane of at least the other of said first and second transducer element rows;

comparing a series of outputs of transducer elements of at least said one of said first and second transducer element rows and a series of output of transducer elements of at least said other of said first and second transducer element rows; and performing a focus detection applying calculation based on shifts or displacements of images by said first and second light beams.

2. A focus detecting apparatus comprising:

a first and a second photoelectric transducer element row whose light receiving planes are arranged in positions optically equivalent to plane positions which are located before and behind a presumed focal plane of an image forming optical system;

a shift or displacement generating optical system disposed in front of said light receiving planes of said first and second transducer element rows for separating a light beam passing through an exit pupil of said image forming optical system into a first light beam passing primarily through a first half portion of said exit pupil and a second light beam passing primarily through a second half portion of said exit pupil, which portions are divided by a plane including an optical axis of the image forming optical system, and for directing one of said first and second light beams to the light receiving plane of at least one of said first and second transducer element rows and directing the other of said first and second light beams to the light receiving plane of at least the other of said first and second transducer element rows; and calculation means for performing a focus detection comparing a series of outputs of transducer elements of at least said one of said first and second transducer element rows and a series of outputs of transducer elements of at least said other of said first and second transducer element rows and applying calculation based on shifts or displacements of images formed by said first and second light beams.

3. A focus detecting method comprising:

arranging light receiving planes of a first and a second photoelectric transducer element row in positions optically equivalent to plane positions which are located before and behind a presumed focal plane of an image forming optical system;

separating a light beam passing through an exit pupil of said image forming optical system into a first light beam passing primarily through first half portions of said exit pupil and a second light beam passing primarily through second half portions of said exit pupil, which portions are divided by a plane including an optical axis of said image forming optical system, by an image shift generating optical system which is disposed in front of said first and second transducer element rows;

directing said first and second light beams to said light receiving planes of said first and second transducer element rows, respectively;

calculating a first shift or displacement of images formed by said first and second light beams based on outputs of transducer elements of one of said first and second transducer element rows and calculating a second shift or displacement of images formed by said first and second light beams based on outputs of transducer elements of the other of said first and second transducer element rows; and calculating a defocused amount of a focus position of said image forming optical system from said presumed focal plane employing said first and second shifts and a difference in an optical path between said light receiving planes of said first and second rows and said presumed focal plane.

4. A focus detecting apparatus comprising:

a first and a second photoelectric transducer element row whose light receiving planes are arranged in positions optically equivalent to plane positions which are located before and behind a presumed focal plane of an image forming optical system, respectively;

a shift or displacement generating optical system disposed in front of said light receiving planes of said first and second transducer element rows for separating a light beam passing through an exit pupil of said image forming optical system into a first light beam passing primarily through a first half portion of said exit pupil and a second light beam passing primarily through a second half portion of said exit pupil, which portions are divided by a plane including an optical axis of the image forming optical system, and for directing said first and second light beams to the light receiving planes of said first and second transducer element rows, respectively;

shift calculation means for calculating a first shift of images formed by said first and second light beams based on outputs of transducer elements of one of said first and second transducer element rows and for calculating a second shift of an image formed by said first and second light beams based on outputs of transducer elements of the other of said first and second transducer element rows; and defocused amount calculation means for calculating a defocused amount of a focus position of said image forming optical system from said presumed focal plane employing said first and second shift obtained by said shift calculating means and a difference of an optical path between said light receiving planes of said first and second transducer element rows and said presumed focal plane.

5. A focus detecting apparatus according to claim 4, in which each of the first and second photoelectric transducer element rows comprises 2n transducer elements (n is a positive integer), the shift generating optical system comprising a striped mask plate formed by arranging n masks in the direction of each transducer element row, which masks lie over each of parts of both adjacent light receiving surfaces of each pair of transducer elements, which pair comprises two adjacent transducer elements in each of the first and the second transducer element rows and the shift calculation means calculates shifts based on output distributions of a transducer element group of n pairs in each of the first and the second rows and output distributions of another transducer element group of n pairs.

6. A focus detecting method comprising:

arranging light receiving planes of a first and a second photoelectric transducer element row in positions optically equivalent to plane positions which are located before and behind a presumed focal plane of an image forming optical system, respectively;

separating a light beam passing through an exit pupil of said image forming optical system into a first light beam passing primarily through a first half portion of said exit pupil and a second light beam passing primarily through a second half portion of said exit pupil, which portions are divided by a plane including an optical axis of the image forming optical system, by a shift generating optical system which is disposed in front of said light receiving planes of said first and second transducer element rows;

directing one of said first and second light beams to the light receiving plane of one of the first and the second rows and directing said first and second light beams to the light receiving plane of the other of the first and the second rows;

calculating a first shift of images which is caused by receiving said one of the first and the second light means and a second shift of images which is caused by receiving said first and second beams, on the light receiving planes of the first and the second rows, employing outputs of transducer elements of said first and second rows; and calculating a defocused amount of a focus position of the image forming optical system from said presumed focal plane employing said first and second shifts and a difference of an optical path between the light receiving planes of the first and the second row and the presumed focal plane.

7. A focus detecting apparatus comprising:

a first and second photoelectric transducer element row whose light receiving planes are arranged in positions optically equivalent to plane positions which are located before and behind a presumed focal plane of an image forming optical system;

a shift generating optical system disposed in front of said light receiving planes of said first and second transducer element rows for separating a light beam passing through an exit pupil of said image forming optical system into a first light beam passing primarily through a first half portion of said exit pupil and a second light beam passing primarily through a second half portion of said exit pupil, which portions are divided by a plane including an optical axis of the image forming optical system and for directing one of said first and second light beams to the light receiving plane of one of said first and second rows and directing said first and second light beams to the light receiving plane of the other of said first and second rows;

shift calculating means for calculating a first shift of images which is caused by said first and second light beams and a second shift of images which is caused by receiving one of said first and second light beams, between the light receiving planes of said first and second rows, employing outputs of transducer elements of the first and the second row;

defocused amount calculation means for calculating a defocused amount of a focus position of the image forming optical system from the presumed focal plane employing said first and second shifts calculated by said shift calculating means and a difference of an optical path between the light receiving planes of the first and the second row and the presumed focal plane.

8. A focus detecting apparatus according to claim 7, in which the first and the second photoelectric transducer element rows each comprises 2n transducer elements, the shift generating optical system comprising a striped mask plate formed by arranging n masks in the direction of each of the first and the second rows, which masks each lie over portions of two adjacent light receiving surfaces of each pair of transducer elements, each pair comprising two adjacent transducer elements in each of the first and the second rows and the shift calculation means calculates a first shift based on output distributions of transducer elements of n pairs of one of a first and a second transducer element group in one of the first and the second rows and output distributions of transducer elements of n pairs of the other of the two groups in the other of the first and the second rows, and a second shift based on output distributions of transducer elements of n pairs of one of the first and the second groups in said one of the first and the second rows and output distributions of transducer elements of n pairs of one of the two groups in said the other of the first and the second rows.

9. A focus detecting apparatus comprising:

a first and a second photoelectric transducer element row whose light receiving planes are arranged in positions optically equivalent to plane positions which are located before and behind a presumed focal plane of an image forming optical system, respectively;

a shift generating optical system disposed in front of said light receiving planes of said first and second rows for separating a light beam passing through an exit pupil of said image forming optical system into a first light beam passing primarily through a first half portion of said exit pupil and a second light beam passing primarily through a second half portion of said exit pupil, which portions are divided by a plane including an optical axis of the image forming optical system and for directing one of the first and the second light beams to the light receiving plane of one of the first and the second rows and directing said first and second light beams to the light receiving plane of the other of the first and the second rows;

shift calculating means for calculating a first shift of an image which is caused by receiving the first and the second light beam and a second shift of an image which is caused by receiving one of the first and the second rows, between the light receiving planes of said first and second rows, employing outputs of transducer elements of the first and the second rows;

defocused amount calculation means for calculating a defocused amount of a focus position of the image forming optical system from the presumed focal plane employing said first and second shifts obtained by said shift calculation means and a difference of an optical path between the light receiving planes of the first and the second row and the presumed focal plane;

image forming optical system movement determination means for determining a distance and a sense of movement of the image forming optical system by calculating a shift evaluation function based on said first shift and employing said defocused amount and said shift evaluation function; and focus detection means for detecting a focus condition by calculating an image blur evaluation function for evaluating the sharpness of an image on the light receiving plane of each of said first and second rows from outputs of transducer elements of said first and second rows employing said image blur evaluation function and said shift evaluation function.

10. A focus detecting apparatus according to claim 9, in which each of said first and second transducer element rows comprises 2n transducer elements and said shift generating optical system comprises a striped mask plate formed by arranging n masks in the direction of each of the first and second transducer element rows, which masks lie over each of parts of both adjacent light receiving surfaces of each pair of transducer elements, which pairs each comprise two adjacent transducer elements in each of the first and second transducer element rows.

11. A focus detecting apparatus according to claim 10, in which each of the first and the second transducer element rows further includes an image blur detecting transducer element group for detecting an image blur, each transducer element of which group is disposed between each pair of transducer elements in each of the first and the second rows and each transducer element of said image blur detecting group is positioned and exposed to slit portions between masks so as not to be shaded by masks of the shift generating optical system.

12. A focus detecting method comprising:
arranging light receiving planes of a first and a second photoelectric transducer element row in positions optically equivalent to plane positions which are located before and behind a presumed focal plane of an image forming optical system, respectively;
separating a light beam passing through an exit pupil of said image forming optical system into a first light beam passing primarily through a first half portion of the exit pupil and a second light beam passing primarily through a second half portion of the exit pupil, which portions are divided by a plane including an optical axis of the image forming optical system, by a shift generating optical system which is disposed in front of the light receiving planes of said first and second transducer element rows;
directing at least one of said first and second light beams to the light receiving plane of one of said first and second transducer element rows and directing at least the other of said first and second light beams to the light receiving plane of the other of said rows;
calculating a shift evaluation function based on the shift of an image which is caused by receiving said first and second light beams between the light receiving planes of said first and second rows, employing outputs of transducer elements of said first and second rows;
calculating an image blur evaluation function which evaluates the sharpness of an image on the light receiving plane of each of said first and second rows; and
determining a focus detection employing said image blur evaluation function and said shift evaluation function.

13. A focus detecting apparatus comprising:
a first and a second photoelectric transducer element row whose light receiving planes are arranged in positions optically equivalent to plane positions which are located before and behind a presumed focal plane of an image forming optical system;
a shift generating optical system disposed in front of said light receiving planes of said first and second rows for separating a light beam passing through an exit pupil of said image forming optical system into a first light beam passing primarily through a first half portion of said exit pupil and a second light beam passing primarily through a second half portion of said exit pupil which portions are divided by a plane including an optical axis of the image forming optical system, and for directing at least one of said first and second light beams to the light receiving plane of one of said first and second rows and directing at least the other of said first and second light beams to the light receiving plane of the other of said first and second rows;
calculation and decision means for calculating a shift evaluation function based on shift of an image which is caused by receiving said first and second light beams between light receiving planes of said first and second rows, employing outputs of transducer elements of said first and second rows and an image blur evaluation function which evaluates the sharpness of an image on the light receiving plane of each of said first and second rows to decide a focus detection by said image blur evaluation function and said shift evaluation function.

14. A focus detecting apparatus according to claim 13, in which each of the first and the second rows of photoelectric transducer elements comprises n transducer elements and the shift generating optical system comprises a striped mask plate formed by arranging a first group of n masks each of which covers a part of one end portion of each transducer element in the direction of one of said first and second rows and a second group of n masks each of which covers a part of the other end portion of each transducer element in the direction of the other of said first and second rows.

15. A focus detecting apparatus according to claim 14, in which each of said first and second rows further includes a group of n transducer elements for detecting an image blur which elements are alternately arranged with transducer elements in each of the first and the second rows and each element of said transducer element group is positioned and exposed in slit portions between masks so as not to be shaded by the masks of the shift generating optical system.

16. A focus detecting apparatus according to claim 14, in which n transducer elements forming the first and the second row are arranged relative to each other in phase positions, and the first group of masks are arranged in the direction of one of the first and the second rows and the second group of masks arranged in the direction of the other of the first and second rows are mutually arranged in positions shifted by half a cycle period.

17. A focus detecting apparatus according to claim 14, in which n transducer elements forming each of said first and second rows are arranged in such a manner that exposed portions which are not shaded by the masks are mutually arranged in phase positions.

18. A focus detecting apparatus comprising:
a taking lens;
first and second linear arrays of of light sensitive elements positioned at locations before and beyond the focal plane of the taking lens;

means for directing first and second portions of the light rays passing through said taking leans towards said first and second linear arrays;

each array having first and second groups of light sensitive elements arranged in alternating fashion;

shift means for directing said first portion of rays to said first group and for directing said second portion of rays to said second group in each array;

determining means responsive to the outputs of said light sensitive elements for determining the focus condition of said taking lens.

19. The focus detecting apparatus of claim 18 further comprising means for moving said taking lens responsive to the output of said determining means.

20. The apparatus of claim 19 further comprising means responsive to said determining means for displaying the focus condition of said taking lens.

* * * * *

UNITED STATES PATENT AND TRADEMARK OFFICE
CERTIFICATE OF CORRECTION

PATENT NO. : 4,626,674

DATED : December 2, 1986

INVENTOR(S) : Ken'ichi Oinoue

It is certified that error appears in the above-identified patent and that said Letters Patent is hereby corrected as shown below:

IN THE ABSTRACT line 3, change "position" to --positions--.

IN THE SPECIFICATION

Column 14, line 57, change "2," to --21,--.

Column 16, line 7, change "67'" to --$\delta$'--.

IN THE CLAIMS

Column 26, Claim 4, line 44, change "shift" to --shifts--.

Column 27, Claim 6, line 21, change "means" to --beams--.

Column 29, Claim 11, line 24, after "exposed" insert --in opposing fashion--.

Signed and Sealed this

Third Day of November, 1987

Attest:

DONALD J. QUIGG

Attesting Officer

Commissioner of Patents and Trademarks